US012099112B2

(12) United States Patent
Felch et al.

(10) Patent No.: US 12,099,112 B2
(45) Date of Patent: Sep. 24, 2024

(54) SYSTEMS AND METHODS FOR MANAGING SENSORS OF AN ELECTRONIC DEVICE, AND ASSOCIATED ELECTRONIC DEVICES

(71) Applicant: GOOGLE LLC, Mountain View, CA (US)

(72) Inventors: Andrew Felch, Palo Alto, CA (US); Christopher Findeisen, San Antonio, TX (US); JinJie Chen, Sunnyvale, CA (US); Mark Alexander, Mountain View, CA (US); Shang Shi, Sunnyvale, CA (US); Zhuo Wang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 649 days.

(21) Appl. No.: 17/145,134

(22) Filed: Jan. 8, 2021

(65) Prior Publication Data
US 2022/0221573 A1 Jul. 14, 2022

(51) Int. Cl.
*G01S 13/86* (2006.01)
*G01S 7/28* (2006.01)
(Continued)

(52) U.S. Cl.
CPC .......... *G01S 13/862* (2013.01); *G01S 7/2813* (2013.01); *G01S 7/539* (2013.01); *G01S 15/50* (2013.01); *G06F 3/017* (2013.01)

(58) Field of Classification Search
CPC ...... G01S 13/862; G01S 7/2813; G01S 7/539; G01S 15/50; G06F 3/017
See application file for complete search history.

(56) References Cited

U.S. PATENT DOCUMENTS 9,063,574 B1 6/2015 Ivanchenko
9,354,709 B1 5/2016 Heller et al.
(Continued)

FOREIGN PATENT DOCUMENTS

JP 2005-242759 A 9/2005
JP 2013-115649 A 6/2013
(Continued)

OTHER PUBLICATIONS

International Search Report and Written Opinion for PCT/US2022/011407 mailed Apr. 20, 2022, 16 pages.

*Primary Examiner* — Alvaro E Fortich
*Assistant Examiner* — Martin Walter Braunlich
(74) *Attorney, Agent, or Firm* — Kilpatrick Townsend & Stockton LLP

(57) ABSTRACT

Embodiments are provided for managing the operation of sensors in an electronic device. According to certain aspects, the electronic device may detect a change in motion from a set of lower-sensitivity sensor data generated by a sensor(s) operating in a lower-sensitivity mode. When the change in motion is detected and during a timeout window, the sensor(s) may generate an additional set of lower-sensitivity sensor data and a set of higher-sensitivity sensor data. The electronic device may initially confirm the change in motion based on analyzing the set of higher-sensitivity sensor data. Further, the electronic device may determine that the additional set of lower-sensitivity does not indicate an additional change in motion, and may deem the confirmation of the change in motion as a false positive.

20 Claims, 12 Drawing Sheets

(51) Int. Cl.
  *G01S 7/539* (2006.01)
  *G01S 15/50* (2006.01)
  *G06F 3/01* (2006.01)

(56) References Cited

U.S. PATENT DOCUMENTS

| | | | |
|---|---|---|---|
| 9,817,109 B2* | 11/2017 | Saboo | G06F 3/011 |
| 10,401,490 B2* | 9/2019 | Gillian | H04W 4/80 |
| 10,452,116 B1* | 10/2019 | Devries | G01P 15/097 |
| 10,656,299 B2* | 5/2020 | Nogueira-Nine | G01S 13/04 |
| 10,794,997 B2* | 10/2020 | Amihood | G06F 1/3275 |
| 11,841,933 B2* | 12/2023 | Giusti | H04W 12/06 |
| 2009/0063574 A1 | 3/2009 | Kim | |
| 2013/0050425 A1 | 2/2013 | Im et al. | |
| 2013/0194287 A1 | 8/2013 | Nicholson et al. | |
| 2014/0006830 A1 | 1/2014 | Kamhi et al. | |
| 2014/0193030 A1 | 7/2014 | Burr | |
| 2014/0237277 A1 | 8/2014 | Mallinson et al. | |
| 2015/0206682 A1 | 7/2015 | Sala et al. | |
| 2016/0018872 A1 | 1/2016 | Tu et al. | |
| 2017/0097413 A1 | 4/2017 | Gillian et al. | |
| 2019/0220112 A1 | 7/2019 | Thomas | |
| 2020/0278738 A1 | 9/2020 | Madar, III et al. | |
| 2020/0410072 A1* | 12/2020 | Giusti | G01S 13/56 |

FOREIGN PATENT DOCUMENTS

| | | |
|---|---|---|
| JP | 2014-137762 A | 7/2014 |
| JP | 2016-086334 A | 5/2016 |
| JP | 2022-002033 A | 1/2022 |
| WO | WO-2019/236120 A1 | 12/2019 |

\* cited by examiner

SYSTEMS AND METHODS FOR MANAGING SENSORS OF AN ELECTRONIC DEVICE, AND ASSOCIATED ELECTRONIC DEVICES

FIELD OF THE DISCLOSURE

The present disclosure relates to managing sensor operation on an electronic device and, more particularly, to managing the operation of various sensors and algorithms that process the corresponding sensor data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electronic devices, such as smartphones and other devices, continue to improve technologically. Generally, electronic devices incorporate more and/or improved sensors to facilitate various functionalities, modes, and applications associated with the electronic devices. With the additional and/or improved sensors along with the increased device capabilities, device resource management becomes more difficult. In particular, additional sensor usage consumes more power and utilizes more central processing unit (CPU) bandwidth, among other increased resource usage.

To accommodate this increased power and CPU demand, electronic devices are typically designed with sufficient CPU and memory capabilities. However, this can increase hardware costs associated with manufacturing the electronic devices. Additionally, sensors that actively operate in their highest signal-to-noise ratio (SNR) mode increase the noise in the environment for other devices. Moreover, because devices are often designed with sufficient heat dissipation to compensate for worst case operating conditions, the resulting devices are often larger than necessary, which can constrain the physical design and increase user expectations with potential adverse market implications.

SUMMARY

According to implementations, an electronic device may manage multiple algorithms that process data from one or more sensors, for example a radar sensor and/or an ultrasound sensor. The sensor(s) may continually generate a set of sensor data, which an initial motion recognition algorithm may analyze and, based on the analysis, detect a change in motion of a target in proximity to the electronic device. When the change in motion is detected, the electronic device may cache the set of sensor data in memory and initiate a supplemental motion recognition algorithm that processes data from the sensor. The electronic device may also facilitate "clutter removal" in which a portion of the set of sensor data that does not indicate motion may be removed from the set of sensor data cached in memory.

The supplemental motion recognition algorithm may analyze the set of sensor data that was cached in memory and, based on the analysis, confirm the change in motion that was initially detected by the initial motion recognition algorithm. If the supplemental motion recognition algorithm does not confirm the change in motion, then the change in motion initially detected by the initial motion recognition algorithm may be deemed a false positive.

In situations in which a false positive is detected, the electronic device may cease the supplemental motion recognition algorithm. Therefore, the electronic device may revert to executing only the initial motion recognition algorithm, which conserves compute, memory, power, and/or thermal resources.

In situations in which the change in motion is confirmed, the supplemental motion recognition algorithm may process additional sensor data generated by the sensor and facilitate various functionalities. For example, the supplemental motion recognition algorithm may be a gesture recognition algorithm that may detect user gestures performed in proximity to the electronic device.

In other implementations, a sensor may operate in a first mode and generate a corresponding first set of first mode sensor data. An initial algorithm may analyze the first set of first mode sensor data and detect a change in motion of a target in proximity to the electronic device. In response, the sensor may additionally operate in a second mode and generate a corresponding set of second mode sensor data, which may be cached in memory.

The electronic device may initiate a supplemental algorithm that retrieves and analyzes the cached sensor data. Based on any motion detected in the cached sensor data, the electronic device may continue or terminate operation of the supplemental algorithm.

In additional implementations, a sensor may operate in a lower-sensitivity mode and generate a corresponding set of lower-sensitivity sensor data. An initial algorithm may analyze the set of lower-sensitivity sensor data and detect a change in motion of a target in proximity to the electronic device.

The electronic device may start a timeout window and, during the timeout window, the same sensor or a different sensor may operate in a higher-sensitivity mode and generate a corresponding set of higher-sensitivity sensor data. The electronic device may further initiate a supplemental algorithm that processes the set of higher-sensitivity sensor data and confirms the originally-detected change in motion.

Additionally, the initial algorithm may analyze an additional set of lower-sensitivity generated during the timeout window and determine that additional motion was not detected during the timeout window. As a result, the electronic device may determine that the change in motion initially confirmed by the set of higher-sensitivity sensor data was actually a false positive.

One example embodiment of the techniques of this disclosure is a computer-implemented method of managing sensor activity in an electronic device. The method includes retrieving, by a processor from at least one sensor of the electronic device operating in a lower-sensitivity mode, a set of lower-sensitivity sensor data, and detecting a change in motion of a target relative to the electronic device based on analyzing, by the processor, the set of lower-sensitivity sensor data. The method further includes, based on detecting the change in motion and for a set amount of time: retrieving, by the processor from the at least one sensor operating in a higher-sensitivity mode, a set of higher-sensitivity sensor data, retrieving, by the processor from the at least one sensor operating in the lower-sensitivity mode, an additional set of lower-sensitivity sensor data, analyzing, by the processor, the set of higher-sensitivity sensor data and the additional set of lower-sensitivity sensor data, and based on analyzing the set of higher-sensitivity sensor data, confirming the change in motion relative to the electronic device. Further, the method includes, after the set of amount of time elapses: based on analyzing the additional set of lower-sensitivity sensor data, determining that an additional change in motion relative to the electronic device was not detected, and deeming, as a false positive, the confirmation of the change in motion based on analyzing the set of higher-sensitivity sensor data.

Another example embodiment of the techniques of this disclosure is an electronic device. The electronic device comprises a first sensor configured to operate in a lower-sensitivity mode, a second sensor configured to operate in a higher-sensitivity mode, and a processor interfaced with the first sensor and the second sensor. The processor is configured to retrieve, from the first sensor, a set of lower-sensitivity sensor data, detect a change in motion of a target relative to the electronic device based on analyzing, the set of lower-sensitivity sensor data, based on detecting the change in motion, initiate a timeout window, and while the timeout window is active: retrieve, from the second sensor, a set of higher-sensitivity sensor data, retrieve, from the first sensor, an additional set of lower-sensitivity sensor data, analyze the set of higher-sensitivity sensor data and the additional set of lower-sensitivity sensor data, and based on analyzing the set of higher-sensitivity sensor data, detect an additional change in motion relative to the electronic device. After the timeout window elapses, the processor is further configured to, based on analyzing the additional set of lower-sensitivity sensor data, determine that motion relative to the electronic device was not detected, and deem, as a false positive, the detection of the additional change in motion based on analyzing the set of higher-sensitivity sensor data.

A further example embodiment of the techniques of this disclosure is a non-transitory computer-readable memory storing instructions thereon that, when executed by one or more processors of an electronic device, cause the one or more processors to: retrieve, from at least one sensor of the electronic device operating in a lower-sensitivity mode, a set of lower-sensitivity sensor data, analyze the set of lower-sensitivity sensor data to detect a change in motion of a target relative to the electronic device, and based on detecting the change in motion and for a set amount of time: retrieve, from the at least one sensor operating in a higher-sensitivity mode, a set of higher-sensitivity sensor data, retrieve, from the at least one sensor operating in the lower-sensitivity mode, an additional set of lower-sensitivity sensor data, analyze the set of higher-sensitivity sensor data and the additional set of lower-sensitivity sensor data, and based on analyzing the set of higher-sensitivity sensor data, detect an additional change in motion relative to the electronic device. Further, after the set of amount of time elapses: the instructions that, when executed by the one or more processors, further cause the one or more processors to, based on analyzing the additional set of lower-sensitivity sensor data, determine that a further change in motion relative to the electronic device was not indicated in the additional set of lower-sensitivity sensor data, and deem, as a false positive, the detection of the additional change in motion based on analyzing the set of higher-sensitivity sensor data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Systems and method for managing motion detection features in an electronic device are described. According to certain aspects, an electronic device may be configured with one or more sensors, such as a radar sensor(s), an ultrasound sensor(s), and/or others. The sensor(s) may operate in different modes according to various contexts and instructions. Similarly, the electronic device may execute different algorithms and applications that process the sensor data from the sensor(s) operating in the different modes. Generally, the different sensor modes and the different algorithms consume different amounts of device resources. Accordingly, the described aspects are configured to manage the operation of the sensor(s) and device algorithms to reduce or otherwise increase the efficiency of the resource consumption.

Generally, the electronic device may execute an initial algorithm to detect motion or other events in proximity to the electronic device based on sensor data generated by a given sensor. Based on the detected motion, the electronic device may initiate a subsequent algorithm to process the original sensor data and/or additional sensor data. Alternatively or additionally, the electronic device may activate an additional sensor and process resulting data generated by the additional sensor. The electronic device may utilize a memory cache to more efficiently and effectively determine whether to continue execution of the subsequent algorithm. If the electronic device determines that the subsequent algorithm is not needed, the electronic device may terminate the subsequent algorithm.

By managing the operation of sensors, sensor modes, and algorithms that process sensor data, the electronic device may more efficiently and effectively manage its resource consumption. Accordingly, more affordable hardware components may be used and fewer hardware components may be needed in the electronic device, thus lowering the costs of manufacturing such electronic devices. Additionally, the electronic device may experience longer battery life and longer device longevity. Moreover, sensor noise in the environment of such electronic devices may be decreased. It should be appreciated that additional benefits are envisioned.

Figure 1:
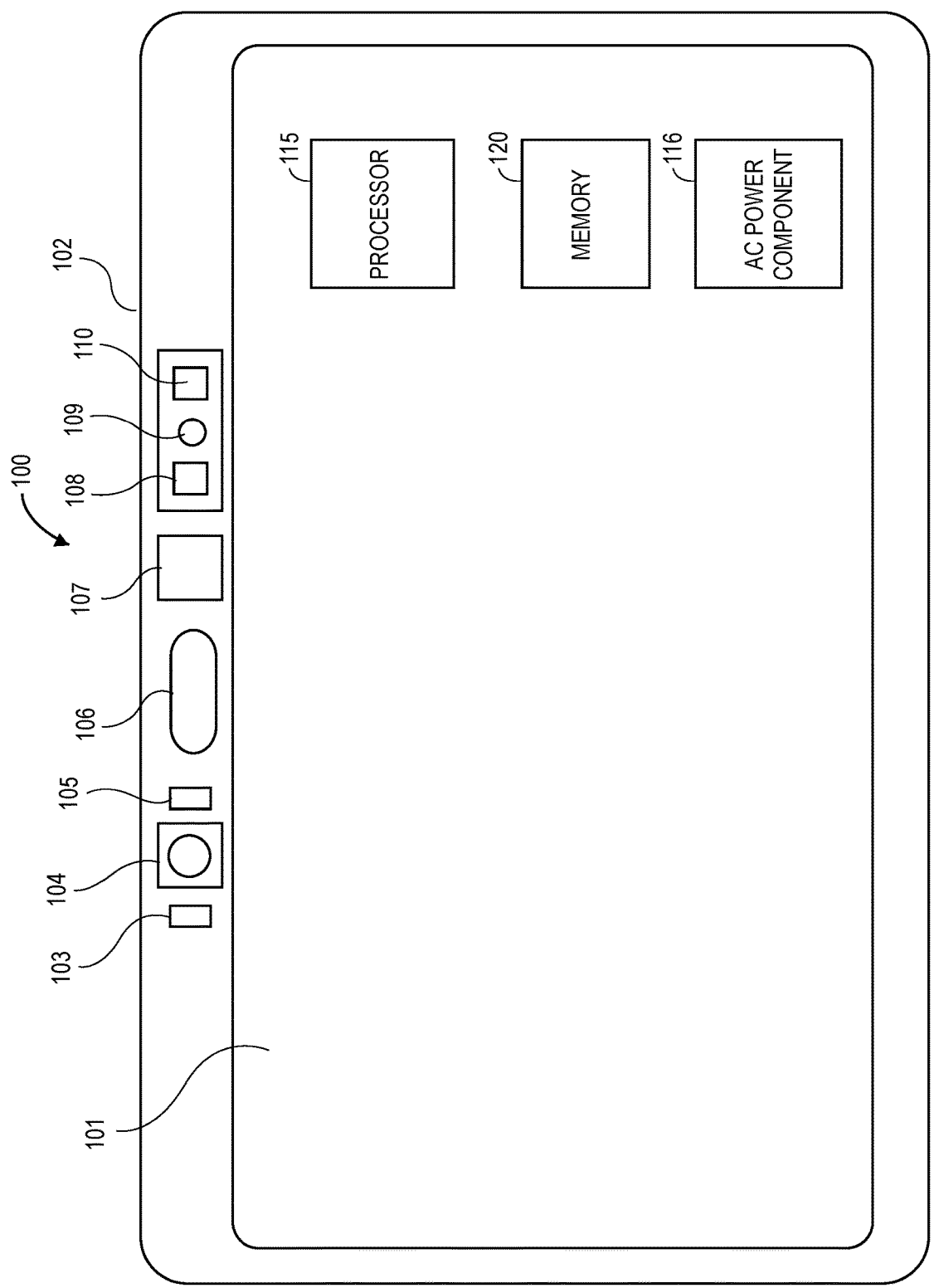
FIG. 1 illustrates an example electronic device that may facilitate the described features, in accordance with some embodiments.

FIG. 1 illustrates an example electronic device 100 in which the described embodiments may be incorporated, and/or on which the described embodiments may be facilitated or implemented. The electronic device 100 may be any type of electronic device such as a mobile device (e.g., a smartphone), display assistant device, desktop computer, notebook computer, tablet, phablet, GPS (Global Positioning System) or GPS-enabled device, watch, glasses, bracelet, other wearable electronic device, PDA (personal digital assistant), pager, and/or the like.

The electronic device 100 may include a user interface 101 that may be embodied as a touchscreen or other type of display that may display or present visual content. In embodiments in which the user interface 101 is a touchscreen, the user interface 101 may incorporate a set of touch-sensitive input panels that may enable a user to make selections or otherwise interface with the electronic device 100. The electronic device 100 may further include a housing 102 in which various components (including the user interface 101) may be incorporated or contained. Additionally, the electronic device 100 may include an alternating current (AC) power component 116 configured to power the electronic device 100 and components thereof, where the AC power component 116 may supply the power or otherwise receive the power from a power supply. It should be appreciated that additional or alternative power supplies are envisioned, for example one or more batteries or other power supplies.

According to embodiments, the electronic device 100 may include a variety of sensors, user interface components, and/or the like. In particular, as depicted in FIG. 1, the electronic device 100 may include a pair of infrared image sensors 103, 109 as well as an image sensor 104. Additionally, the electronic device 100 may include a speaker 106 that may be configured to output audio. Further, the electronic device 100 may include a dot projector 108 and a flood illuminator 110. According to embodiments, the pair of infrared image sensors 103, 109, the dot projector 108, and the flood illuminator 110 may be used singularly or in combination by the electronic device 100 to unlock various features of the electronic device 100 (e.g., unlock the user interface 101), among other functionalities. Moreover, the electronic device 100 may include an ambient light sensor (ALS) 105 that may support various proximity detection features. It should be appreciated that alternative and additional sensors are envisioned. For example, one of the sensors may be an ultrasound sensor configured to emit ultrasonic waves. Additionally, it should be appreciated that the sensors and components may be disposed in different arrangements and combinations.

The electronic device 100 may additionally include a radar chip 107. Generally, the radar chip 107 may detect and measure properties of remote and/or proximate objects based on their interactions with radio waves. The radar chip 107 may include a set of transmitter components that emits radio waves, which are then scattered, or redirected, by objects within their paths, with some portion of energy reflected back and intercepted by a set of receiver components. The radar chip 107 may be bidirectional and thus configured to emit signals in two or more directions (e.g., in front of and in back of the electronic device 100), or directional and thus configured to emit signals in one direction (e.g., in front of the electronic device 100). A processor 115 or controller may examine or analyze the received waveforms to detect the presence of objects as well as estimate certain properties of these objects, such as distance and size, among other properties.

Conventional radar designs rely on fine spatial resolution relative to target size in order to resolve different objects and distinguish their spatial structures. Such spatial resolution typically requires broad transmission bandwidth, narrow antenna beamwidth, and large antenna arrays. According to embodiments, the radar chip 107 may employ a sensing paradigm that may be based on motion, rather than spatial structure, which may enable the radar chip 107 to be integrated in the top of the electronic device 100 (or otherwise integrated in another location or portion of the electronic device 100). The electronic device 100 may thus support algorithms, applications, and the like (generally, "algorithms") that may not require forming a well-defined image of a spatial structure of a target, which is in contrast to an optical imaging sensor, for example. Therefore, the algorithms may not generate or use distinguishable images of a target for certain purposes, such as presence detection and/or gesture detection.

The processor 115 may implement various signal processing features and functionalities to process temporal changes in received radar signals, such as to detect and resolve subtle motions. In operation, the radar chip 107 may transmit a frequency-modulated signal in a certain frequency or frequency range (e.g., 50-70 GHz, or other frequencies or frequency ranges), and receive a superposition of reflections off of a nearby object(s) or person(s) (generally, a "target"). The processor 115 may detect a sub-millimeter-scale displacement in a position of a target from one transmission to the next, which may induce a distinguishable timing shift in the received signal(s). Over a window of multiple transmissions, these shifts may manifest as a Doppler frequency that is proportional to a velocity of the target. By resolving different Doppler frequencies, the signal processing features may distinguish different targets moving with different motion patterns. According to embodiments, the signal processing features may include a combination of custom filters and coherent integration steps that may boost the underlying signal-to-noise ratio (SNR), attenuate unwanted interference, and differentiate reflections off a target from noise and clutter. These signal processing features enable the radar chip 107 to operate at low-power within the constraints of the electronic device 100.

The electronic device 100 may support various modes or algorithms that process data from the radar chip 107 and/or from other of the sensors as described herein. Generally, one mode may process and analyze signals having a first frequency (or range of frequencies) and another of the modes may process and analyze signals having a second frequency (or range of frequencies) different from the first frequency. For example, one of the modes may be "presence mode" that may be configured to detect the presence of a target (e.g., a person) in proximity to the electronic device 100. In this example, the presence of a target may be detected when the target enters a room in which the electronic device 100 is located. Another of the modes may be "gesture mode" that may be configured to detect and recognize gestures performed by a person in proximity to the electronic device 100 (e.g., in front of the user interface 101). In this example, the gestures may be "macro" gestures (e.g., a movement of a hand to switch active applications) or "micro" gestures (e.g., simulating the turning of a dial using an index finger and thumb). Generally, the processor 115 may execute the various algorithms using various machine learning techniques.

The modes may operate differently and may thus have varying degrees of accuracy as well as varying degrees of resource consumption, including compute, memory, electricity, and/or thermal. For example, the gesture mode may process shorter-range waves emitted from the radar chip 107 and the presence mode may process longer-range waves emitted from the radar chip 107. Additionally, the shorter-range waves may have a higher SNR and may be more accurate, and the longer-range waves may have a lower SNR and may be less accurate. However, the gesture mode that processes the shorter-range waves may have a higher resource consumption, and the presence mode that processes the longer-range waves may have a lower resource consumption.

The radar chip 107 may be capable of operating in multiple modes simultaneously (i.e., emitting both shorter-range and longer-range waves over a period of time), and similarly the processor 115 of the electronic device 100 may simultaneously execute algorithms that process the received waveforms resulting from the emitted shorter-range and longer-range waves. According to embodiments, longer-range radar sensing may be accomplished by a Frequency Modulated Continuous Wave (FMCW) radar using a slower frequency sweep from a first frequency to a second frequency. In contrast, a shorter-range radar mode may use a faster frequency sweep from a first frequency to a second frequency. To conserve resource usage, it may be advantageous to limit the amount and types of algorithms that the processor 115 executes. For example, in cases in which a person is not actually performing gestures in proximity to the electronic device 100, it is advantageous for the processor 115 to deactivate or otherwise not execute the gesture mode, such as to conserve various resources.

According to embodiments, the different sensor modes and device algorithms may operate based on different contexts. In particular, certain sensor modes and/or algorithms may be disabled or enabled based on time of day, day of week/month/year, month of year, time since last motion detection, and/or other situations. For example, the gesture mode may be deactivated between the hours of 1:00 AM and 5:00 AM. For further example, a sleep sensing mode may be deactivated between the hours of 9:00 AM and 9:00 PM. As an additional example, a higher-sensitivity sensor mode may be disabled if the time since last motion detection exceeds ten (10) minutes. Thus, resources may be conserved based on these modes and algorithms being selectively disabled. It should be appreciated that these contexts may be static or may adjust according to usage of the electronic device 100, among other factors or conditions, or may be explicitly activated or deactivated by a user.

Further, according to embodiments, certain sensors or detections by the sensors may trigger the activation or initiation of other certain sensor modes and device algorithms. Generally, a lower-sensitivity mode having lower resource usage for a given sensor may detect motion in proximity to the electronic device 100, and may cause a higher-sensitivity mode having higher resource usage to initiate, where the higher-sensitivity mode may operate on that given sensor or on another sensor. The electronic device 100 may also initiate an algorithm that processes the higher-sensitivity sensor data. Further, sensor data generated as a result of the higher-sensitivity mode may be used to confirm (or not confirm) the initially-detected motion. If additional motion is indicated in the higher-sensitivity data, the electronic device 100 may continue to operate the initiated algorithm and facilitate operations and functionalities accordingly.

The electronic device 100 may include a memory 120 with which the processor 115 may interface. The memory 120 may include a main memory portion as well as a cache portion for the temporary storage of certain data that the processor 115 may access. According to embodiments, the processor 115 may store certain sensor data (e.g., sensor data from the radar chip 107) in the cache portion, to enable the processor 115 to confirm certain detected movements or motion. Additionally or alternatively, the processor 115 may initiate a certain algorithm that accesses and analyzes data stored in the cache portion to enable for the more accurate detection or recognition of motion or movement by the certain algorithm. Because machine learning algorithms need a certain amount of time prior to accurately detecting targets and motion, the cache portion of the memory 120 enables the algorithms with access to the needed data before the target arrives in a zone and/or performs a certain motion or gesture in that zone.

Figure 2:
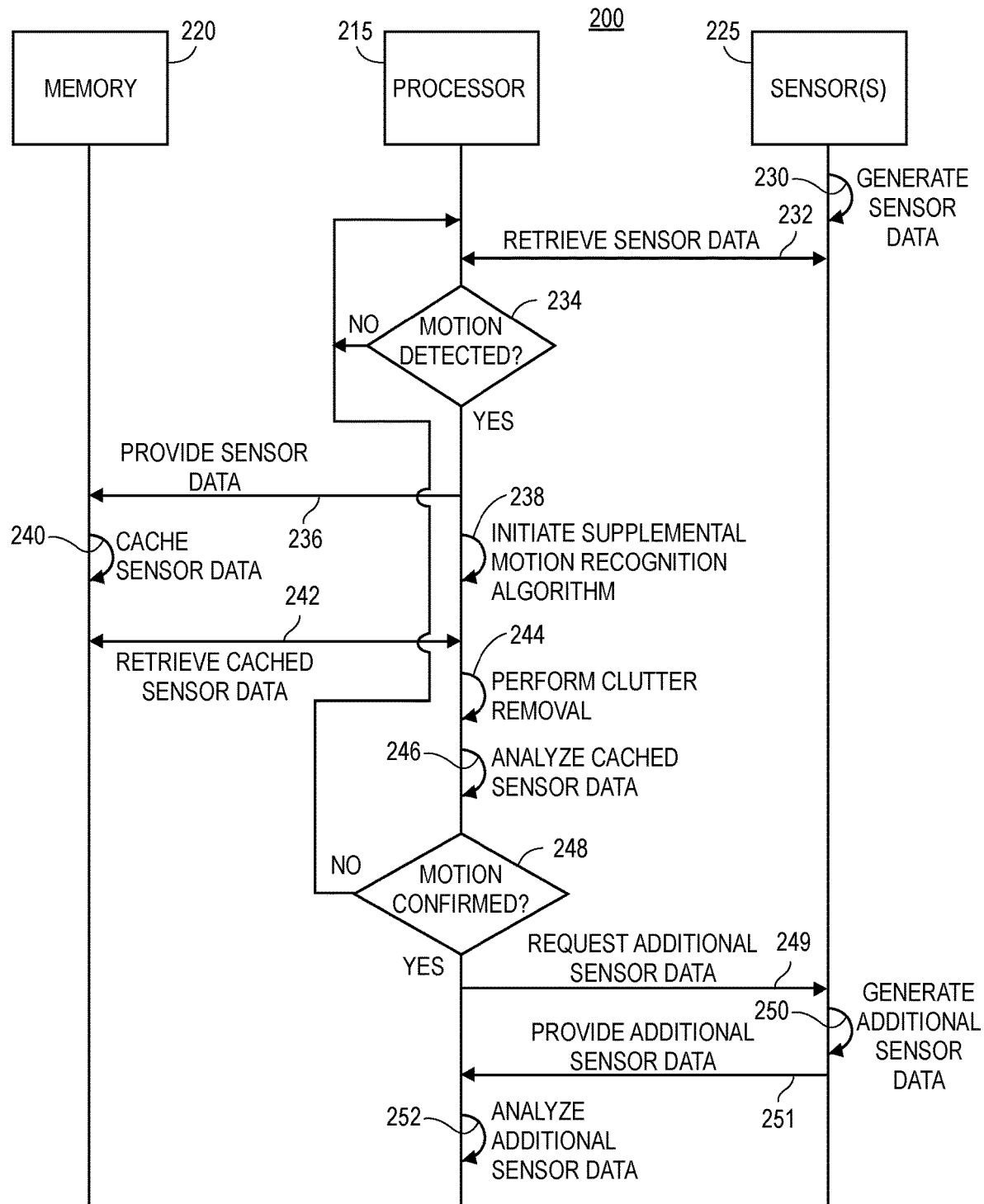
FIG. 2 is an example diagram associated with a technique for managing sensor operation using a memory cache, in accordance with some embodiments.

FIG. 2 is a signal diagram 200 associated with various embodiments of the systems and methods. The signal diagram 200 includes a memory 220 (such as the memory 120 as described with respect to FIG. 1), a processor 215 (such as the processor 115 as described with respect to FIG. 1), and one or more sensors 225 (such as one or more of the various sensors as discussed with respect to FIG. 1). In embodiments, the sensor(s) 225 may include a single sensor (e.g., a single radar sensor), or multiple sensors (e.g., a radar sensor and an ultrasound sensor). Further, the memory 220, the processor 215, and the sensor(s) 225 may be embodied or incorporated in a single electronic device. Additionally, the memory 220 may be a hardware cache accessible by the processor 215 and configured to cache data for faster access by the processor 215. It should be appreciated that various of the functionalities as illustrated in the signal diagram 200 may occur at various times or orders relative to the other functionalities.

The signal diagram 200 may begin when the sensor(s) 225 generates (230) sensor data. For example, if the sensor 225 is a radar sensor, the radar sensor may emit radio waves and detect the resulting waveforms. According to embodiments, in generating the sensor data, the sensor(s) 225 may operate in a first operating mode. For example, if the sensor 225 is a radar sensor, the radar sensor may emit radio waves having a longer-range frequency, such as to detect the presence of targets in a proximity of the electronic device. The processor 215 may retrieve (232), from the sensor(s) 225, the generated sensor data. It should be appreciated that the sensor(s) 225 may continuously generate, and the processor 215 may continuously retrieve, the sensor data.

The processor 215 may analyze the retrieved sensor data and determine (234) whether there is motion detected. In particular, the processor 215 may analyze the sensor data (e.g., received waveforms) and determine if motion is indicated in the sensor data. In analyzing the sensor data, the processor 215 may execute an initial algorithm, such as a motion detection algorithm, that is configured to process the sensor data resulting from the sensor(s) 225 operating in the first operating mode. If the processor 215 does not detect motion ("NO"), processing may return to (230/232), end, or proceed to other functionality. Otherwise, if the processor 215 detects motion ("YES"), the processor 215 may provide (236) the sensor data to the memory 220. After receiving the sensor data, the memory 220 may store (cache) (240) the sensor data for subsequent access by the processor 215. It should be appreciated that the memory 220 may cache the sensor data on a rolling basis as the sensor(s) 225 generates additional sensor data and the processor 215 retrieves the additional sensor data.

After detecting motion, the processor 215 may also initiate (238) a supplemental motion recognition algorithm. According to embodiments, the supplemental motion recognition algorithm may be different than the initial algorithm that the processor 215 executes in detecting the motion in (234). For example, the processor 215 may detect the motion in (234) while operating in a presence mode and the supplemental motion recognition algorithm may be associated with a gesture mode. Generally, the supplemental motion recognition algorithm may consume more resources (e.g., compute, memory, electrical, and/or thermal) than the initial algorithm.

The processor 215 may also retrieve (242) the sensor data that is cached in the memory 220. In certain embodiments, the processor 215 may perform (244) a "clutter removal" or background subtraction technique on the sensor data that is retrieved from the memory 220. In performing the clutter removal, the processor 215 may analyze the retrieved sensor data and remove, from the retrieved sensor data, a portion of the data that does not indicate motion. Accordingly, the remaining data may include data that indicates (or may indicate) motion.

The processor 215, in executing the supplemental motion recognition algorithm, may analyze (246) the cached sensor data, with or without the background data (i.e., data without detected motion) removed. In association with the supplemental motion recognition algorithm analyzing the cached sensor data, the processor 215 may determine whether the motion detected in (234) is confirmed. By analyzing the cached sensor data, the supplemental motion recognition algorithm may determine whether the motion detection in (234) by the initial algorithm was a false positive. If the supplemental motion recognition algorithm does not confirm the detected motion ("NO"; i.e., the motion detection by the initial algorithm was a false positive), processing may return to (230/232), end, or proceed to other functionality.

If the supplemental motion recognition algorithm does confirm the detected motion ("YES"; i.e., the motion detection by the initial algorithm was not a false positive), the processor may continue operation of the supplemental motion recognition algorithm. In particular, the processor 215 may request (249) the sensor(s) 225 to generate and provide additional sensor data. After receiving the request, the sensor(s) 225 may generate (250) the additional sensor data. According to embodiments, the sensor(s) 225 may generate the additional sensor data while operating in a mode different from the mode the sensor(s) 225 operated in when generating the sensor data in (230). For example, the initial sensor data generated in (230) may result from the sensor(s) 225 operating in a presence mode that generates longer-range waves, and the additional sensor data generated in (250) may result from the sensor(s) 225 operating in a gesture mode that generates shorter-range waves. The sensor(s) 225 may provide (251) the additional sensor data to the processor 215.

It should be appreciated that an additional sensor other than the sensor that generated the sensor data in (230) may generate the additional sensor data. Thus, in this implementation, the processor 215 may request (249) the additional sensor to generate the additional sensor data, the additional sensor may generate (250) the additional sensor data, and the additional sensor may provide (251) the additional sensor data to the processor 215.

After receiving the additional sensor data, the supplemental motion recognition algorithm executed by the processor 215 may analyze (252) the additional sensor data. In analyzing the additional sensor data, the supplemental motion recognition algorithm may facilitate various functionalities. For example, if the supplemental motion recognition algorithm is associated with a gesture mode, the supplemental motion recognition algorithm may detect a specific gesture (e.g., the clockwise rotation of a dial) and facilitate a certain action based on the specific gesture (e.g., turning up the volume of a music playback application).

If the supplemental motion recognition algorithm fails to detect an additional change in motion from the additional sensor data, the processor 215 may terminate the supplemental motion recognition algorithm. Accordingly, the processor 215 may revert to solely executing the initial algorithm, such as to conserve various resources of the electronic device. It should be appreciated that the processor 215 may continually execute the initial algorithm throughout the signal diagram 200, or may terminate the initial algorithm in response to the supplemental motion recognition algorithm confirming the motion detection in (248).

Figure 3:
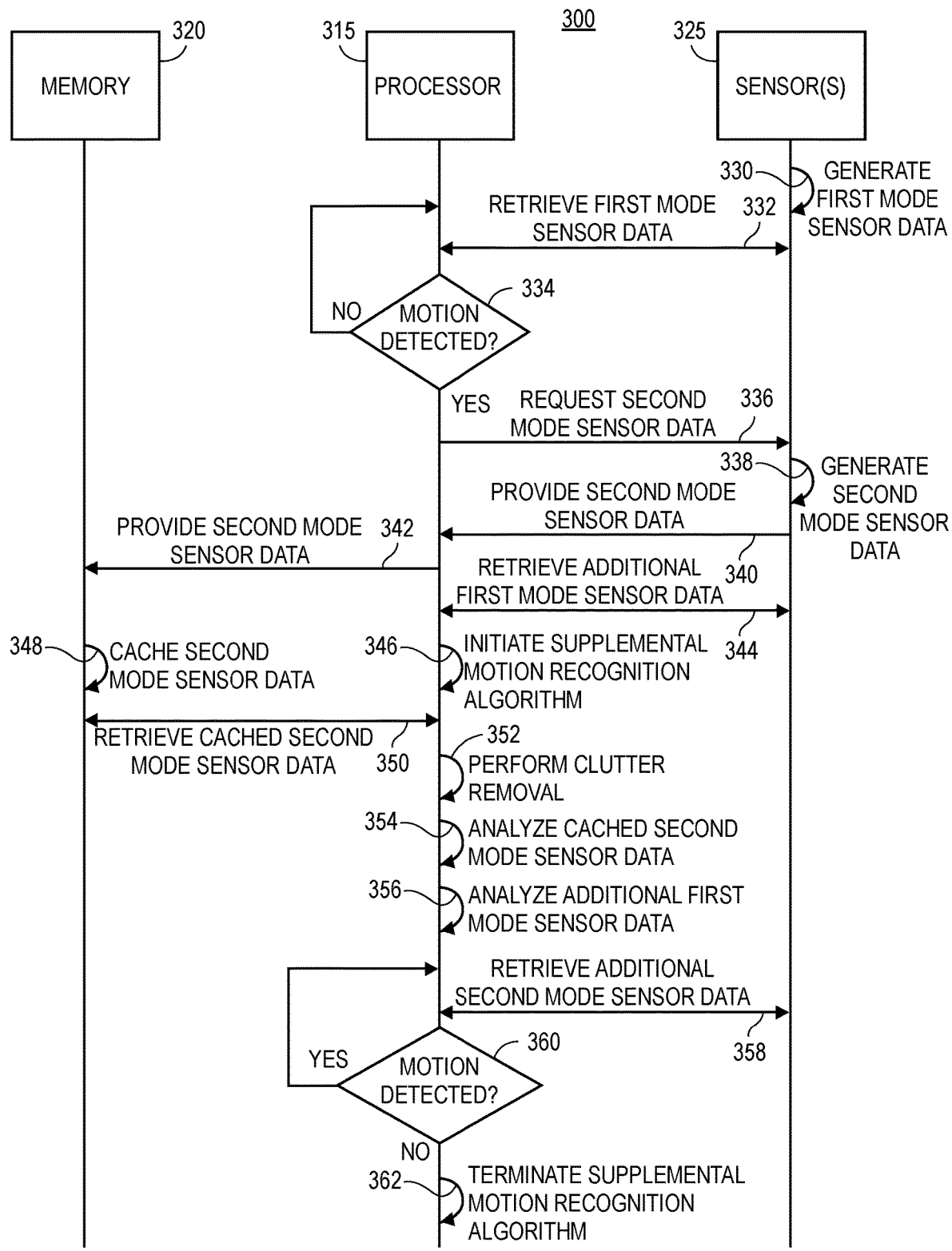
FIG. 3 is an example diagram associated with another technique for managing sensor operation using a memory cache, in accordance with some embodiments.

FIG. 3 is a signal diagram 300 associated with various embodiments of the systems and methods. The signal diagram 300 includes a memory 320 (such as the memory 120 as described with respect to FIG. 1), a processor 315 (such as the processor 115 as described with respect to FIG. 1), and one or more sensors 325 (such as one or more of the various sensors as discussed with respect to FIG. 1). In embodiments, the sensor(s) 325 may include a single sensor (e.g., a single radar sensor), or multiple sensors (e.g., a radar sensor and an ultrasound sensor). Further, the memory 320, the processor 315, and the sensor(s) 325 may be embodied or incorporated in a single electronic device. Additionally, the memory 320 may be a hardware cache accessible by the processor 315 and configured to cache data for faster access by the processor 315. It should be appreciated that various of the functionalities as illustrated in the signal diagram 300 may occur at various times or orders relative to the other functionalities.

The signal diagram 300 may begin when the sensor(s) 325 generates (330) first mode sensor data. For example, if the sensor 325 is a radar sensor, the radar sensor may emit radio waves and detect the resulting waveforms. According to embodiments, in generating the first mode sensor data, the sensor(s) 325 may operate in a first operating mode having a first sensitivity. For example, if the sensor 325 is a radar sensor, the radar sensor may emit radio waves having a longer-range frequency, such as to detect the presence of targets in a proximity of the electronic device. The processor 315 may retrieve (332), from the sensor(s) 325, the generated first mode sensor data. It should be appreciated that the sensor(s) 325 may continuously generate, and the processor 315 may continuously retrieve, the first mode sensor data.

The processor 315 may analyze the retrieved first mode sensor data and determine (334) whether there is motion detected. In particular, the processor 315 may analyze the first mode sensor data (e.g., received waveforms) and determine if motion is indicated in the first mode sensor data. In analyzing the first mode sensor data, the processor 315 may execute an initial motion recognition algorithm that is configured to process the first mode sensor data resulting from the sensor(s) 325 operating in the first operating mode. If the processor 315 does not detect motion ("NO"), processing may return to (330/332), end, or proceed to other functionality.

Otherwise, if the processor 315 detects motion ("YES"), the processor 315 may request (336) the sensor(s) 325 to generate and provide second mode sensor data. After receiving the request, the sensor(s) 325 may generate (338) the second mode sensor data. According to embodiments, the sensor(s) 325 may generate the second mode sensor data while operating in a second mode different from the first mode the sensor(s) 325 operated in when generating the first mode sensor data in (330). For example, the first mode sensor data generated in (330) may result from the sensor(s) 325 operating in a presence mode that generates longer-range waves, and the second mode sensor data generated in (338) may result from the sensor(s) 325 operating in a gesture mode that generates shorter-range waves. The sensor(s) 325 may provide (340) the second mode sensor data to the processor 315.

In some scenarios, the determination in (334) may be based on the processor 315 determining whether the first mode sensor data includes motion above a certain velocity, where this velocity may represent the lowest velocity motion that may contain a gesture. If the processor 315 determines that the first mode sensor data includes motion above the certain velocity ("YES"), processing may continue to (336). If the processor 315 determines that the first mode sensor data does not include motion above the certain velocity ("NO"), processing may return to (330/332), end, or proceed to other functionality.

It should be appreciated that an additional sensor other than the sensor that generated the sensor data in (330) may generate the second mode sensor data. Thus, in this implementation, the processor 315 may request (336) the additional sensor to generate the second mode sensor data, the additional sensor may generate (338) the second mode sensor data, and the additional sensor may provide (340) the second mode sensor data to the processor 315.

Additionally, the processor 315 may provide (342) the second mode sensor data to the memory 320. After receiving the second mode sensor data, the memory 320 may store (cache) (348) the second mode sensor data for subsequent access by the processor 315. It should be appreciated that the memory 320 may cache the second mode sensor data on a rolling basis as the sensor(s) 325 generates the second mode sensor data and the processor 315 retrieves the second mode sensor data.

The processor 315 may retrieve (344) additional first mode sensor data that is generated by the sensor(s) 325 operating in the first operating mode. Additionally, the processor 315 may initiate (346) a supplemental motion recognition algorithm. According to embodiments, the supplemental motion recognition algorithm may be different than the initial motion recognition algorithm that the processor 315 executes in detecting the motion in (334). For example, the processor 315 may detect the motion in (334) while operating in a presence mode and the supplemental motion recognition algorithm may be associated with a gesture mode. Generally, the supplemental motion recognition algorithm may consume more resources (e.g., compute, memory, electrical, and/or thermal) than the initial motion recognition algorithm.

The processor 315 may also retrieve (350) the second mode sensor data that is cached in the memory 320. In certain embodiments, the processor 315 may perform (352) a "clutter removal" or background subtraction technique on the second mode sensor data retrieved from the memory 320. In performing the clutter removal, the processor 315 may analyze the retrieved second mode sensor data and remove, from the retrieved second mode sensor data, a portion of the data that does not indicate motion. Accordingly, the remaining data may include data that indicates (or may indicate) motion.

The processor 315, executing the supplemental motion recognition algorithm, may analyze (354) the cached second mode sensor data, with or without the background data (i.e., data without detected motion) removed. In embodiments, this step enables the supplemental motion recognition algorithm access to the initially-detected motion data in advance of a target being located in a zone tailored to the supplemental motion recognition algorithm, which may improve the motion detection and recognition features of the supplemental motion recognition algorithm. Additionally, the processor 315, in executing the initial motion recognition algorithm, may analyze (356) the additional first mode sensor data. Accordingly, the processor 315 may concurrently execute the initial motion recognition algorithm and the supplemental motion recognition algorithm.

The processor 315 may retrieve (358), from the sensor(s) 325, additional second mode sensor data, where the additional second mode sensor data is generated by the sensor(s) 325 operating in the second mode. The processor 315 may also execute the supplemental motion recognition algorithm to analyze the additional second mode sensor data and, based on the analysis, determine (360) whether there is motion detected. According to embodiments, if the processor 315 detects motion based on the additional second mode sensor data, there may be a target in the zone tailored to the supplemental motion recognition algorithm. For example, the supplemental motion recognition algorithm may be associated with a gesture mode, and the detected motion be associated with a gesture performed by a target. By analyzing both the initial (cached) second mode sensor data and the additional second mode sensor data, the supplemental motion recognition algorithm may experience improved accuracy with motion detection and recognition. In some scenarios, for example, a first motion algorithm may initiate a second algorithm when the first motion algorithm detects motion above a certain velocity, where this velocity may represent the lowest velocity motion that may contain a gesture. Additionally, the second algorithm, once activated, may search/analyze the cached data to determine if the cached data contains or includes a gesture.

If the processor 315 detects motion ("YES"), the processor 315 may continue to retrieve and analyze additional second mode sensor data. If the processor 315 does not detect motion ("NO"), the processor 315 may terminate (362) the supplemental motion recognition algorithm. Accordingly, the electronic device may experience improved resource savings by not executing the supplemental motion recognition algorithm when the second mode sensor data does not indicate motion that the supplemental motion recognition algorithm typically processes. Thus, the processor 315 may revert to solely executing the initial motion recognition algorithm, such as to conserve various resources of the electronic device.

Figure 4:
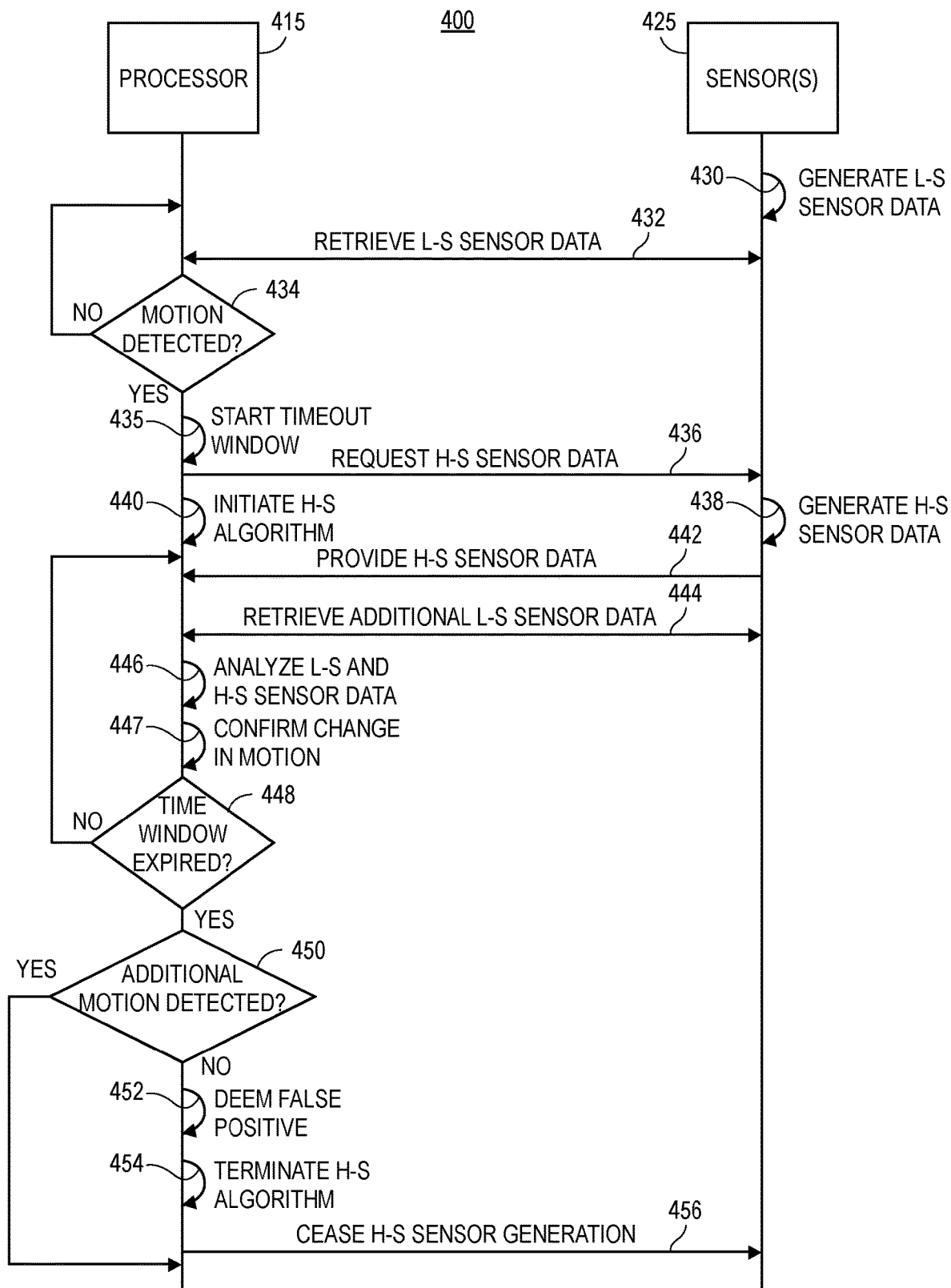
FIG. 4 is an example diagram associated with managing the operation of one or more sensors, in accordance with some embodiments.

FIG. 4 is a signal diagram 400 associated with various embodiments of the systems and methods. The signal diagram 400 includes a processor 415 (such as the processor 115 as described with respect to FIG. 1) and one or more sensors 425 (such as one or more of the various sensors as discussed with respect to FIG. 1). In embodiments, the processor 415 and the sensor(s) 425 may be embodied or incorporated in a single electronic device. It should be appreciated that various of the functionalities as illustrated in the signal diagram 400 may occur at various times or orders relative to the other functionalities.

In a first implementation, the sensor(s) 425 may be two separate sensors. For example, the sensors 425 may include a radar sensor configured to detect gross motion and an ultrasound sensor configured to detect breathing rate. In this implementation, a first sensor of the sensor(s) 425 may be a lower-sensitivity sensor and may correspondingly generate lower-sensitivity sensor data having a lower false positive rate; and a second sensor of the sensor(s) 425 may be a higher-sensitivity sensor and may correspondingly generate higher-sensitivity sensor data having a higher false positive rate. Further, in this implementation, the first sensor may be bidirectional and thus configured to emit signals in two or more directions (e.g., in front of and in back of the electronic device), and the second sensor may be directional and thus configured to emit signals in one direction (e.g., in front of the electronic device). It should be appreciated that both sensors may be either bidirectional or directional.

In a second implementation, the sensor(s) 425 may be a single sensor, for example a radar sensor. In this implementation, the single sensor may operate in multiple modes: a first mode that generates lower-sensitivity data having a lower false positive rate (e.g., a long range radar configuration), and a second mode that generates higher-sensitivity data having a higher false positive rate (e.g., a short range radar configuration). Therefore, although FIG. 4 is illustrated as though a single sensor is interfacing with the processor 415 and generating both the lower-sensitivity and the higher-sensitivity sensor data, it should be appreciated that multiple sensors may interface with the processor 415 and respectively generate the respective sensor data.

The signal diagram 400 may begin when the sensor(s) 425 generates (430) a set of lower-sensitivity sensor data. For example, if the sensor 425 is a radar sensor, the radar sensor may emit radio waves and detect the resulting waveforms. According to embodiments, in generating the sensor data, the sensor(s) 425 may operate in a first operating mode. For example, if the sensor 425 is a radar sensor, the radar sensor may emit radio waves having a longer-range frequency, such as to detect the presence of targets in a proximity of the electronic device. The processor 415 may retrieve (432), from the sensor(s) 425, the generated lower-sensitivity sensor data. It should be appreciated that the sensor(s) 425 may continuously generate, and the processor 415 may continuously retrieve, the lower-sensitivity sensor data.

The processor 415 may analyze the retrieved lower-sensitivity sensor data and determine (434) whether there is motion detected. In particular, the processor 415 may analyze the lower-sensitivity sensor data (e.g., received waveforms) and determine if motion is indicated in the lower-sensitivity sensor data. In analyzing the lower-sensitivity sensor data, the processor 415 may execute an initial algorithm, such as a motion detection algorithm, that is configured to process the lower-sensitivity sensor data resulting from the sensor(s) 425 operating in the first operating mode. If the processor 415 does not detect motion ("NO"), processing may return to (430/432), end, or proceed to other functionality.

Otherwise, if the processor 415 detects motion ("YES"), the processor 415 may start (435) a timeout window, where the timeout window may be various lengths (e.g., ten seconds, twenty seconds, or other lengths of time). Additionally, the processor 415 may request (436) the sensor(s) 425 to generate and provide higher-sensitivity sensor data. After receiving the request, the sensor(s) 425 may generate (438) the higher-sensitivity sensor data.

According to embodiments, the sensor(s) 425 may generate the higher-sensitivity sensor data while operating in a subsequent mode different from the first operating mode the sensor(s) 425 operated in when generating the lower-sensitivity sensor data in (430). For example, the lower-sensitivity sensor data generated in (430) may result from the sensor(s) 425 operating in a presence mode that generates longer-range waves, and the higher-sensitivity sensor data generated in (438) may result from the sensor(s) 425 operating in a gesture mode that generates shorter-range waves. It should be appreciated that different sensors may generate the lower-sensitivity sensor data and the higher-sensitivity sensor data.

The sensor(s) 425 may provide (442) the higher-sensitivity sensor data to the processor 415. Additionally, the processor 425 may retrieve (444), from the sensor(s) 425, additional lower-sensitivity sensor data. According to embodiments, the sensor(s) 425 may continue operation of the first operating mode, where the sensor(s) 425 may continuously generate, and the processor 415 may retrieve, lower-sensitivity sensor data.

The processor 415 may analyze (446) the additional lower-sensitivity and the higher-sensitivity sensor data. In analyzing the additional lower-sensitivity sensor data, the processor 415 may execute the initial algorithm that is configured to process the lower-sensitivity sensor data resulting from the sensor(s) 425 operating in the first operating mode. Further, in analyzing the higher-sensitivity sensor data, the processor 415 may execute a subsequent algorithm that is configured to process the higher-sensitivity sensor data resulting from the sensor(s) 425 operating in the subsequent operating mode. The processor 415 may analyze the higher-sensitivity sensor data to confirm (447) the change in motion that the processor 415 detects in (434). According to embodiments, the processor 415 may confirm the change in motion by detecting a separate or subsequent change in motion that is indicated in the higher-sensitivity sensor data, which may be a continuation of or related to the motion detected in (434).

At (448), the processor 415 may determine if the time window started in (435) is expired. For example, if the time window is ten seconds, the time window expires after ten seconds have elapsed. If the time window is not expired ("NO"), processing may return to (442) where additional lower-sensitivity sensor data and higher-sensitivity sensor data may be retrieved and analyzed. According to embodiments, the sensor(s) 425 may continue to generate, and the processor 415 may continue to analyze, the higher-sensitivity and the lower-sensitivity sensor data.

If the time window is expired ("YES"), the processor 415 may determine (450) whether additional motion is detected. According to embodiments, in determining whether additional motion is detected, the processor 415 may analyze the additional set of lower-sensitivity sensor data. That is, the processor 415 may determine whether additional motion is detected from the additional lower-sensitivity sensor data that is retrieved in (444) after the timeout window is started. If the processor 415 detects additional motion ("YES"), processing may end, repeat, or proceed to other functionality. In an embodiment, the processor 415 may continue to retrieve and analyze higher-sensitivity sensor data generated by the sensor(s) 425 operating in the subsequent operating mode, and facilitate functionalities accordingly. Additionally, the processor 415 may continually determine whether additional motion is detected, and if not, may proceed to (452).

If the processor 415 does not detect additional motion ("NO"), the processor 415 may deem (452), as a false positive, the confirmation of the change in motion from (447). In other words, by the processor 415 not detecting additional motion from the additional lower-sensitivity sensor data, the processor 415 may deem the motion confirmed from the higher-sensitivity sensor data to be a false positive. The processor 415 may further terminate (454) the subsequent algorithm that processes the higher-sensitivity sensor data. Additionally, the processor 415 may request (456) the sensor(s) 225 to cease generating the higher-sensitivity sensor data. Processing may then end, repeat, or proceed to other functionality.

FIGS. 5A-5F illustrate example representations of interactions between an electronic device and a user, as well as various sensor operations based on the interactions. In each of FIGS. 5A-5F, a user 503 is shown at a certain relative distance from a device 502, where a distance scale 504 generally illustrates how far the user 503 is from the device 502 (e.g., short range, medium range, long range, out of range, or somewhere in between). Additionally, each of FIGS. 5A-5F depicts a frequency(ies) at which a radar sensor emits waves, as well as an amplitude of ultrasonic waves emitted by an ultrasound sensor. The representations of FIGS. 5A-5F may be read sequentially as the user 503 moves from out of range of the device 502 to within a short range of the device 502. It should be appreciated that the representations depicted in FIGS. 5A-5F are merely examples and that additional or alternative representations are envisioned.

Figure 5A:
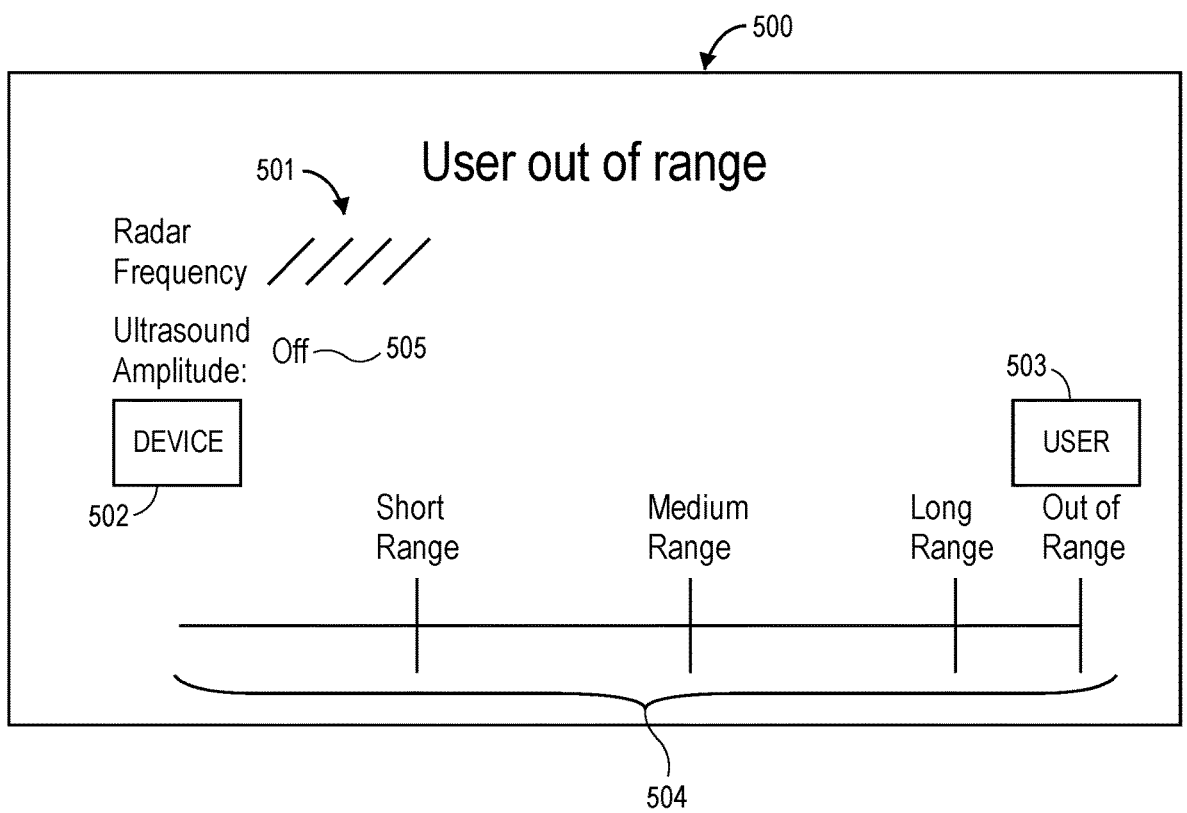
FIGS. 5A-5F illustrate example representations of interactions between an electronic device and a user, as well as various sensor operations based on the interactions, in accordance with some embodiments.

FIG. 5A illustrates a representation 500 of the user 503 who is positioned out of range from the device 502. In this configuration, the radar sensor emits (501) longer-range waves, which generally have a lower SNR (i.e., are less accurate) and allow detection of objects at a further distance from the device 502. Additionally, the ultrasound sensor may be off (505).

Figure 5B:
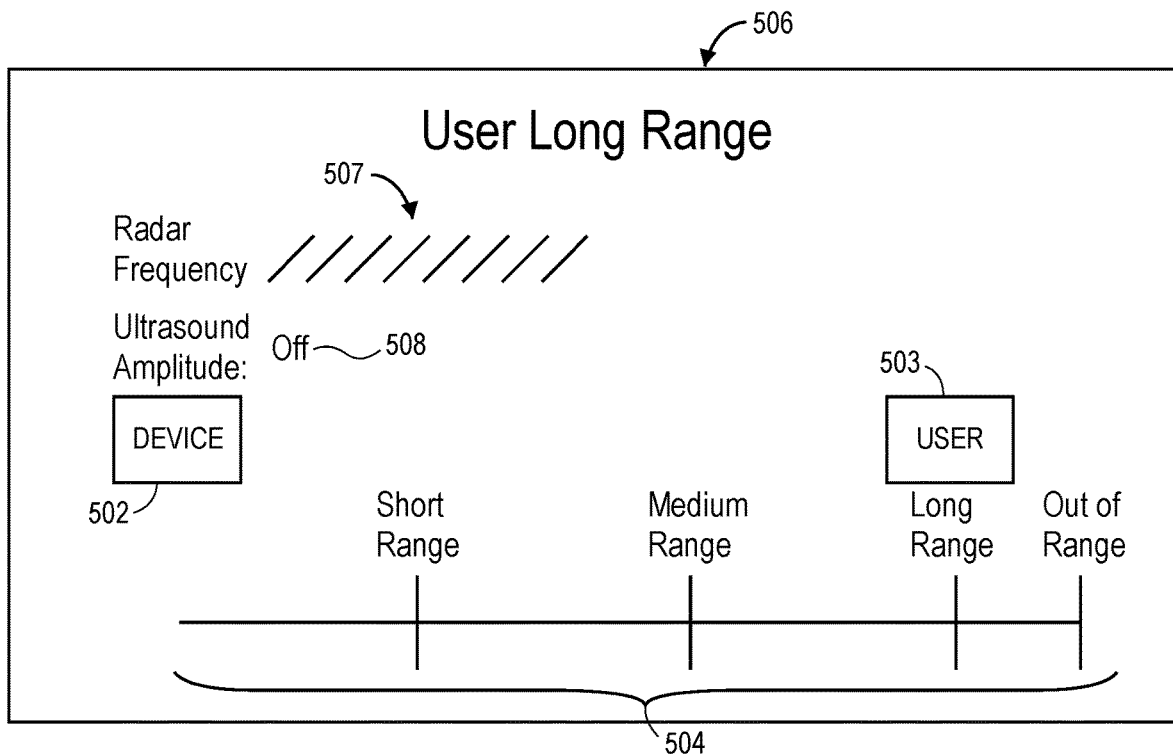

FIG. 5B illustrates a representation 506 of the user 503 who is positioned at a long range from the device 502. In this configuration, the radar sensor still emits (507) longer-range waves, as the user 503 is still located a long range from the device 502. Additionally, the ultrasound sensor remains off (508).

Figure 5C:
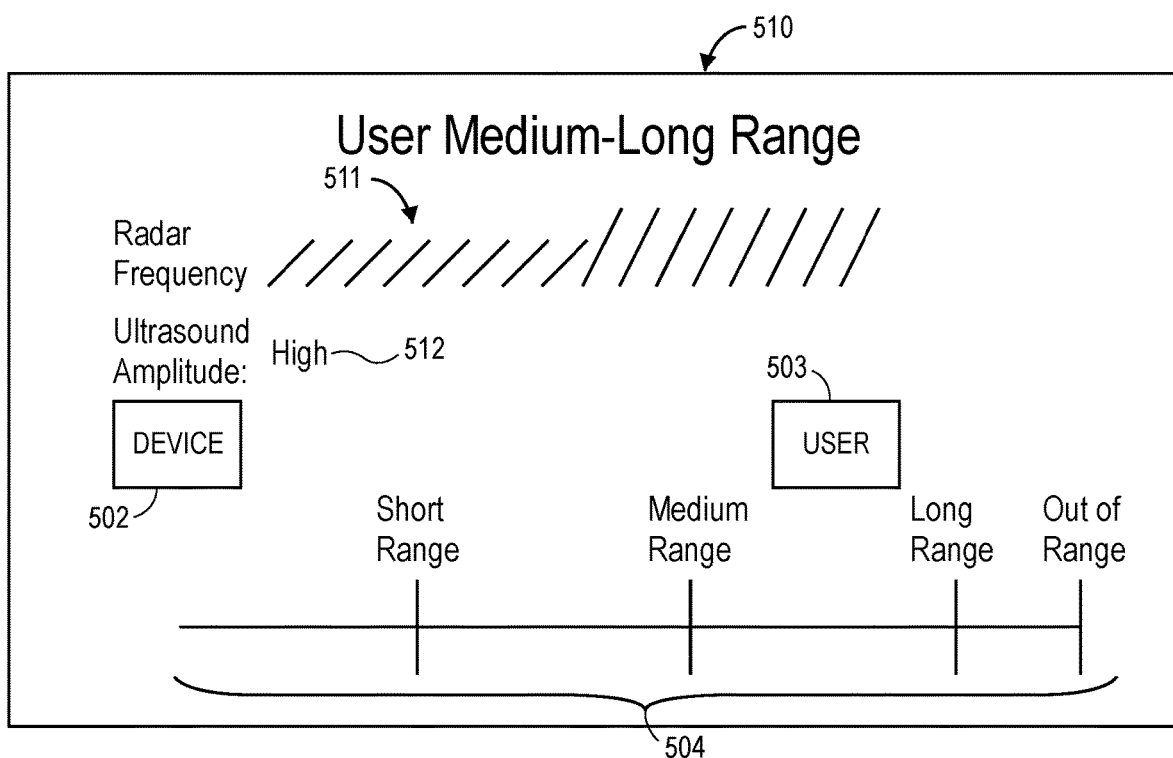

FIG. 5C illustrates a representation 510 of the user 503 who approaches a medium range from the device 502. In this configuration, the radar sensor emits (511) both longer-range waves and medium-range waves. According to embodiments, the radar sensor may emit the longer-range and medium-range waves within a transmission window, such as in an alternating or sequential fashion. By the radar sensor emitting the medium-range waves before the user 503 is positioned a medium range from the device 502, the device 502 may begin to analyze the resulting sensed data in association with an algorithm that processes medium-range waves (e.g., a gesture mode). Additionally, the device 502 may activate the ultrasound sensor which can emit (512) higher-amplitude ultrasonic waves.

Figure 5D:
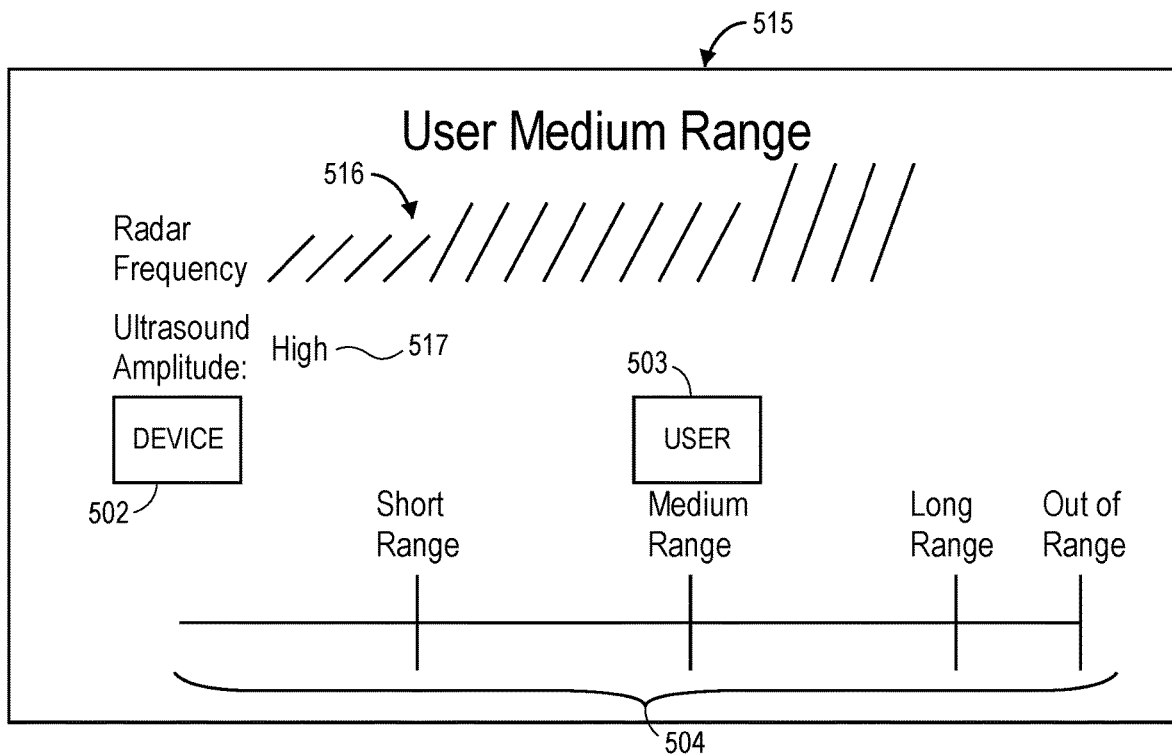

FIG. 5D illustrates a representation 515 of the user 503 who is positioned a medium range from the device 502. In this configuration, the radar sensor emits (516) longer-range waves, medium-range waves, and shorter-range waves. According to embodiments, the radar sensor may emit the longer-range, medium-range, and shorter-range waves within a transmission window, such as in an alternating or sequential fashion. By the radar sensor emitting both the shorter-range and medium-range waves, the device 502 may begin to analyze the resulting sensed data in association with an algorithm(s) that processes medium-range and/or short-range waves (e.g., a "gross" gesture mode and/or a "micro" gesture mode). Additionally, the ultrasound sensor may emit (517) higher-amplitude ultrasonic waves.

Figure 5E:
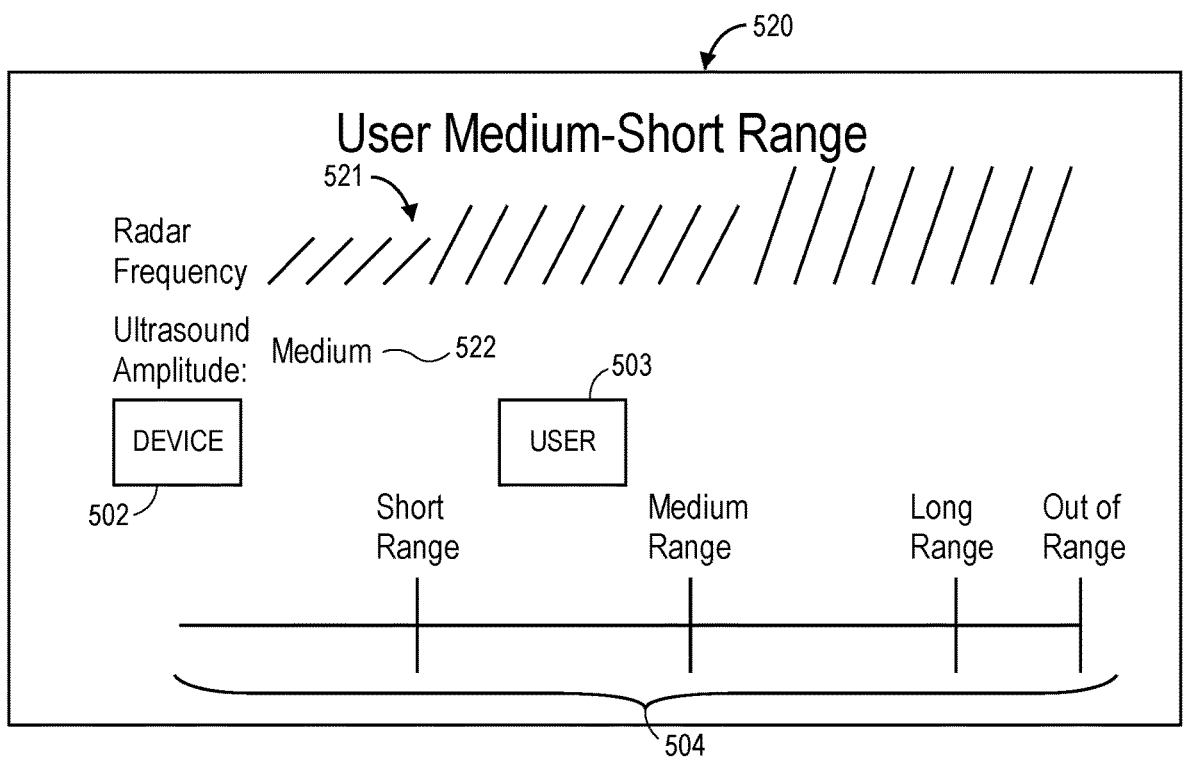

FIG. 5E illustrates a representation 520 of the user 503 who approaches a short range from the device 502. In this configuration, the radar sensor emits (521) longer-range waves, medium-range waves, and shorter-range waves. Compared to the emission (516) of FIG. 5D, the emission (521) of FIG. 5E may include more shorter-range waves (and/or fewer longer-range and/or medium-range waves). According to embodiments, the radar sensor may emit the longer-range, medium-range, and shorter-range waves within a transmission window, such as in an alternating or sequential fashion. By the radar sensor emitting both the shorter-range and medium-range waves, the device 502 may begin to analyze the resulting sensed data in association with an algorithm(s) that processes medium-range and/or short-range waves (e.g., a "gross" gesture mode and/or a "micro" gesture mode). Additionally, the ultrasound sensor may emit (522) medium-amplitude ultrasonic waves.

Figure 5F:
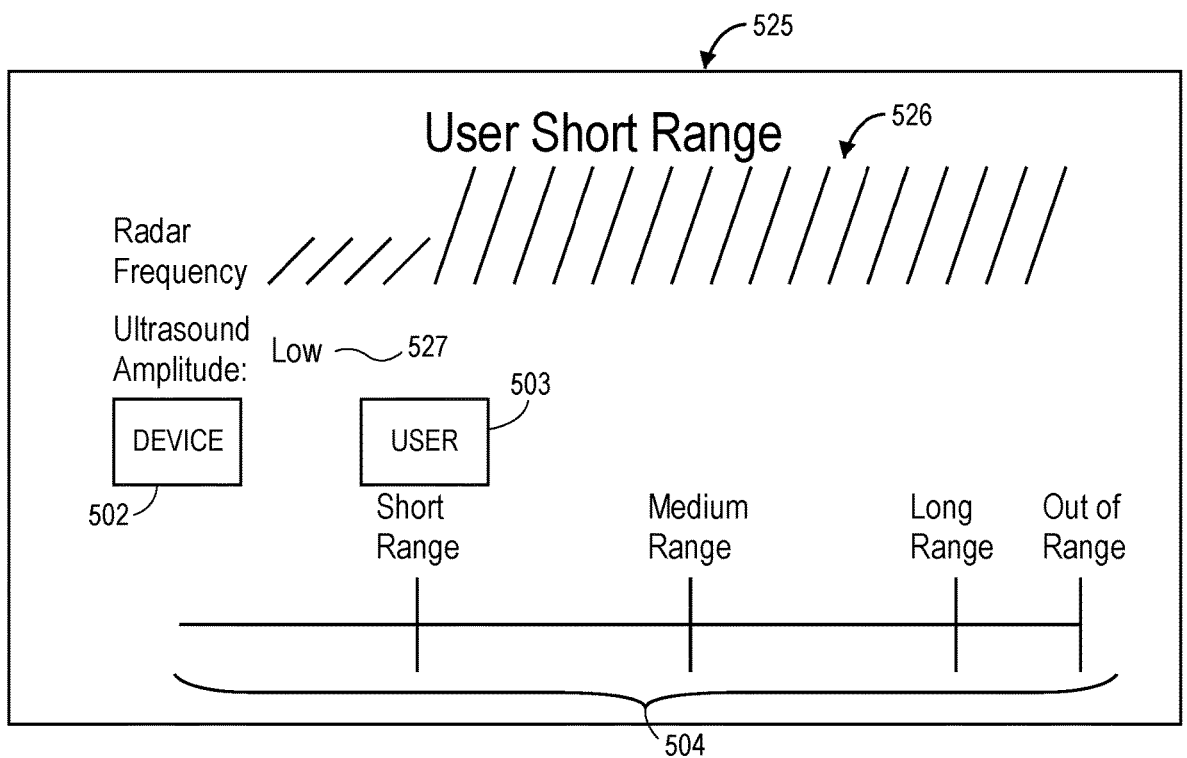

FIG. 5F illustrates a representation 525 of the user 503 who is positioned a short range from the device 502. In this configuration, the radar sensor emits (526) longer-range waves and shorter-range waves. Compared to the emission (516) of FIG. 5D and the emission (521) of FIG. 5E, the emission (526) of FIG. 5F may include more shorter-range waves (and/or fewer or no longer-range and/or medium-range waves). According to embodiments, the radar sensor may emit the longer-range and shorter-range waves within a transmission window, such as in an alternating or sequential fashion. By the radar sensor emitting the shorter-range waves, the device 502 may begin to analyze the resulting sensed data in association with an algorithm(s) that processes the short-range waves (e.g., a "micro" gesture mode). Additionally, by the radar sensor emitting the longer-range waves, the device 502 may still operate a presence mode configured to detect additional objects as well as continue consuming sensor data in case the user 503 retreats from the device 502. Moreover, the ultrasound sensor may emit (527) lower-amplitude ultrasonic waves.

Figure 6:
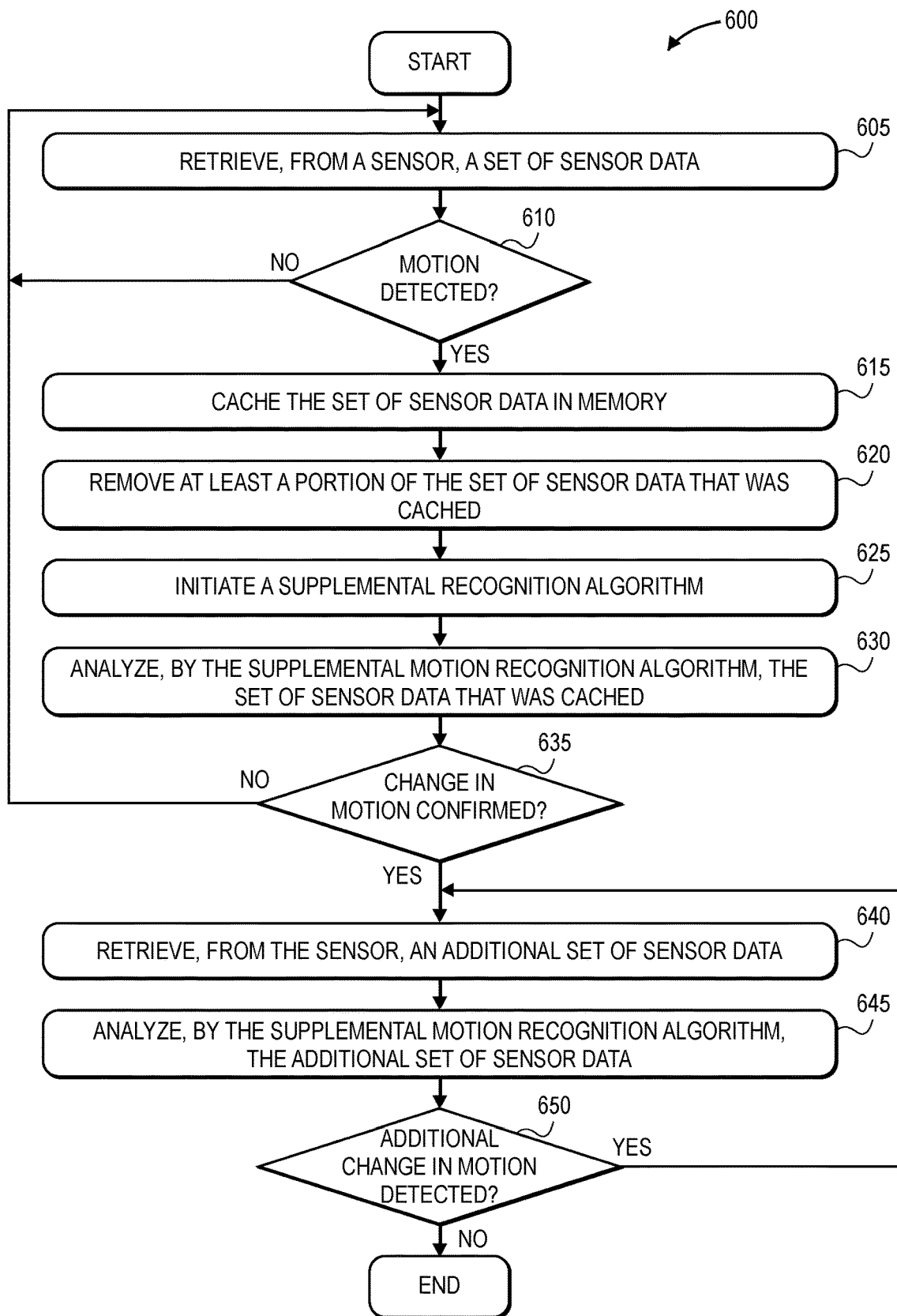
FIG. 6 is a flowchart of a method for an electronic device to manage motion detection features, in accordance with some embodiments.

FIG. 6 is a flowchart of a method 600 for an electronic device to manage motion detection features. The method 600 begins with the electronic device retrieving (block 605), from a sensor of the electronic device, a set of sensor data. According to embodiments, the sensor may be a radar sensor, an ultrasound sensor, or another type of sensor. The electronic device may analyze the set of sensor data and determine (block 610) if motion is detected (i.e., if the set of sensor data indicates a change in motion of a target relative to the electronic device). In analyzing the set of sensor data, the electronic device may execute an initial motion recognition algorithm that may generally consume a lower amount of resources.

If the electronic device does not detect motion ("NO"), processing may return to block 605, end, or proceed to other functionality. If the electronic device detects motion ("YES"), the electronic device may cache (block 615) the set of sensor data in memory. Generally, the electronic device may retrieve and cache the set of sensor data on a rolling basis as the sensor generates the set of sensor data. Additionally, the electronic device may remove (block 620) at least a portion of the set of sensor data that was cached, for example using a background subtraction or clutter removal technique. The removed sensor data may be sensor data that does not indicate motion.

The electronic device may initiate (block 625) a supplemental motion recognition algorithm. According to embodiments, the supplemental motion recognition algorithm may generally consume a higher amount of resources than does the initial motion recognition algorithm. The electronic device may analyze (block 630), by the supplemental motion recognition algorithm, the set of sensor data that was cached and that had at least the portion removed therefrom.

Based on the analysis of block 630, the electronic device may determine (block 635) whether the change in motion detected in block 610 is confirmed (i.e., whether the change in motion detected in block 610 is not a false positive). If the electronic device determines that the change in motion is not confirmed ("NO"), processing may return to block 605, end, or proceed to other functionality. Additionally, the electronic device may terminate the supplemental motion recognition algorithm.

If the electronic device determines that the change in motion is confirmed ("YES"), the electronic device may retrieve (block 640), from the sensor, an additional set of sensor data. In another implementation, the electronic device may retrieve the additional set of sensor data from an additional (i.e., different) sensor. The electronic device may analyze (block 645), by the supplemental motion recognition algorithm, the additional set of sensor data, and facilitate various functionalities of the electronic device accordingly.

Based on the analysis of block 645, the electronic device may determine (block 650) whether there is an additional change in motion detected. According to embodiments, the additional change in motion may be indicative of performed gestures or other user movements performed in proximity to the electronic device. If the electronic device detects the additional change in motion ("YES"), processing may return to block 640, or proceed to other functionality. If the electronic device does not detect the additional change in motion ("NO"), processing may end, repeat, or proceed to other functionality. Additionally, if the electronic device does not detect the additional change in motion, the electronic device may terminate the supplemental motion recognition algorithm.

Figure 7:
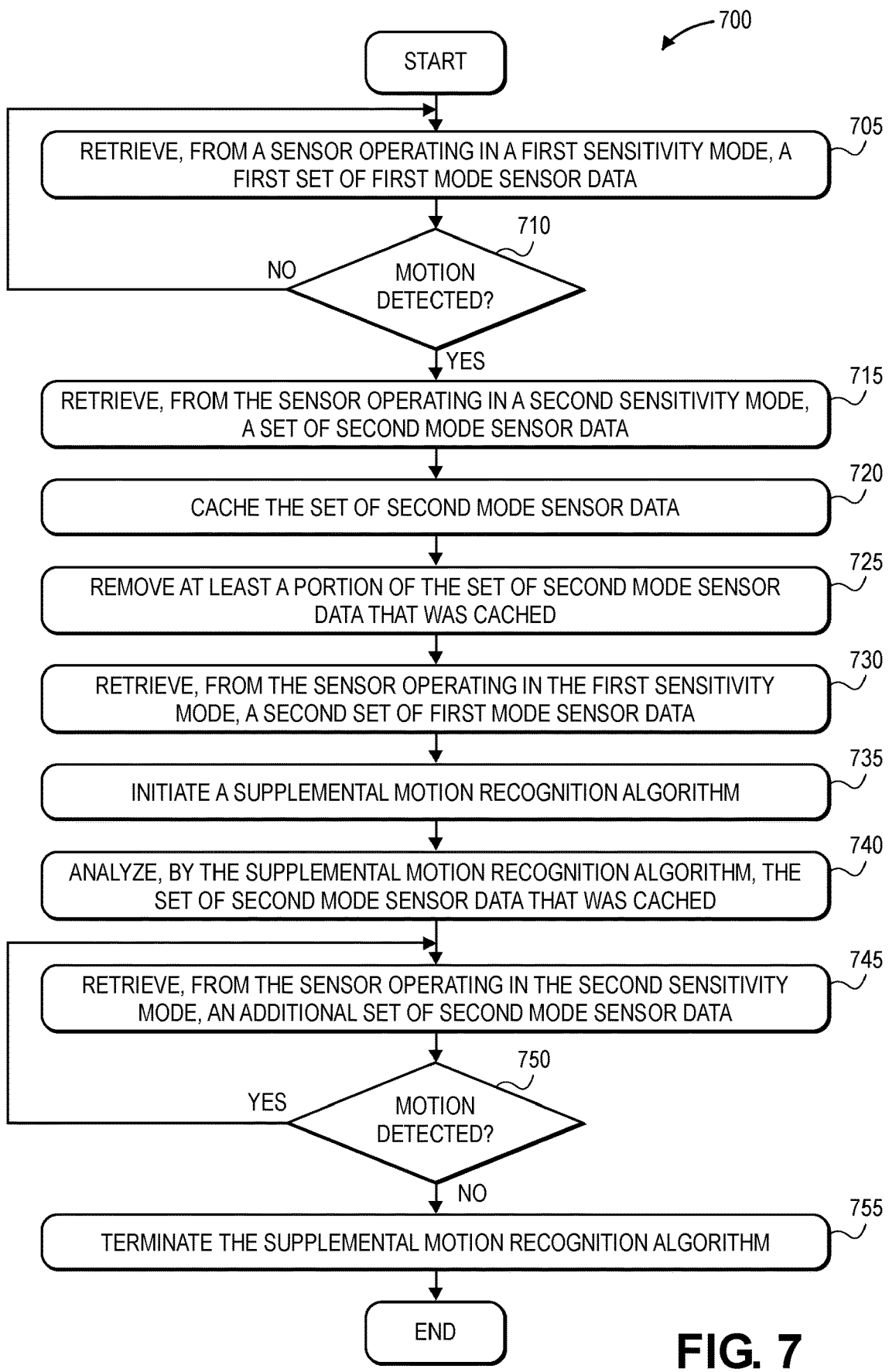
FIG. 7 is a flowchart of another method for an electronic device to manage motion detection features, in accordance with some embodiments.

FIG. 7 is a flowchart of another method 700 for an electronic device to manage motion detection features. The method 700 begins with the electronic device retrieving (block 705), from a sensor of the electronic device operating in a first sensitivity mode, a first set of first mode sensor data. According to embodiments, the sensor may be a radar sensor, an ultrasound sensor, or another type of sensor. The electronic device may analyze the first set of first mode sensor data and determine (block 710) if motion is detected (i.e., if the first set of first mode sensor data indicates a change in motion of a target relative to the electronic device). In analyzing the first set of first mode sensor data, the electronic device may execute an initial motion recognition algorithm that may generally consume a lower amount of resources.

If the electronic device does not detect motion ("NO"), processing may return to block 705, end, or proceed to other functionality. If the electronic device detects motion ("YES"), the electronic device may retrieve (block 715), from the sensor operating in a second sensitivity mode, a set of second mode sensor data. Additionally, the electronic device may cache (block 720) the set of second mode sensor data in memory. Further, the electronic device may remove (block 725) at least a portion of the set of second mode sensor data that was cached, for example using a background subtraction or clutter removal technique. The removed sensor data may be sensor data that does not indicate motion.

The electronic device may retrieve (block 730), from the sensor operating in the first sensitivity mode, a second set of first mode sensor data. Further, electronic device may analyze, by the initial motion recognition algorithm, the second set of first mode sensor data. Thus, the sensor may continue to operate in the first sensitivity mode, and the initial motion recognition algorithm may continue to analyze the resulting sensor data.

The electronic device may also initiate (block 735) a supplemental motion recognition algorithm. According to embodiments, the supplemental motion recognition algorithm may generally consume a higher amount of resources than does the initial motion recognition algorithm. The electronic device may analyze (block 740), by the supplemental motion recognition algorithm, the set of second mode sensor data that was cached and that had at least the portion removed therefrom. Further, the electronic device may retrieve (block 745), from the sensor operating in the second sensitivity mode, an additional set of second mode sensor data, and analyze, using the supplemental motion recognition algorithm, the additional set of second mode sensor data.

Based on this analysis, the electronic device may determine (block 750) whether there is additional motion detected (i.e., whether the additional set of second mode sensor data indicates motion). If the electronic device determines that additional motion is detected ("YES"), processing may return to block 745, end, or proceed to other functionality. If the electronic device determines that additional motion is not detected ("NO"), the electronic device may terminate (block 755) the supplemental motion recognition algorithm.

Figure 8:
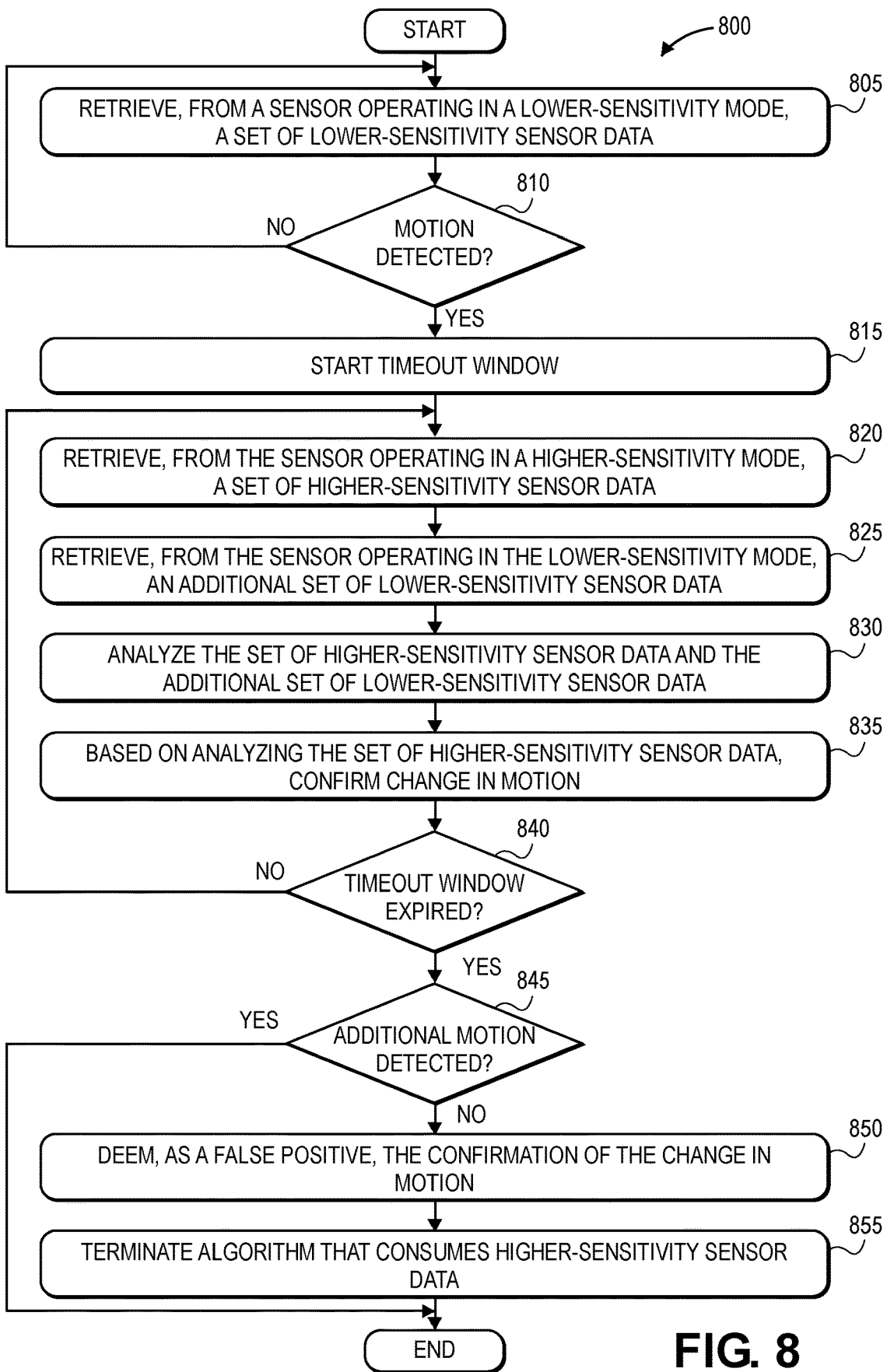
FIG. 8 is a flowchart of a method for an electronic device to manage sensor activity, in accordance with some embodiments.

FIG. 8 is a flowchart of a method 800 for an electronic device to manage sensor activity. The method 800 begins with the electronic device retrieving (block 805), from a sensor of the electronic device operating in a lower-sensitivity mode, a set of lower-sensitivity sensor data. According to embodiments, the sensor may be a radar sensor, an ultrasound sensor, or another type of sensor. The electronic device may analyze the set of lower-sensitivity sensor data and determine (block 810) if motion is detected (i.e., if the set of lower-sensitivity sensor data indicates a change in motion of a target relative to the electronic device). In analyzing the set of lower-sensitivity sensor data, the electronic device may execute an initial algorithm that may generally consume a lower amount of resources.

If the electronic device does not detect motion ("NO"), processing may return to block 805, end, or proceed to other functionality. If the electronic device detects motion ("YES"), the electronic device may start (815) a timeout window, which may vary in length (e.g., ten seconds, one minute, etc.). Further, the electronic device may retrieve (block 820), from the sensor operating in a higher-sensitivity mode, a set of higher-sensitivity sensor data. According to embodiments, the electronic device may request the sensor to generate the set of higher-sensitivity sensor data and initiate a subsequent algorithm that processes the set of higher-sensitivity sensor data and that may generally consume a higher amount of resources than does the initial algorithm. Additionally, the sensor may continue to operate in the lower-sensitivity mode, and the electronic device may retrieve (block 825), from the sensor operating in the lower-sensitivity mode, an additional set of lower-sensitivity sensor data.

The electronic device may analyze (block 830) the set of higher-sensitivity sensor data and the additional set of lower-sensitivity sensor data. In particular, the electronic device may analyze the set of higher-sensitivity sensor data using the subsequent algorithm and analyze the additional set of lower-sensitivity sensor data using the initial algorithm. Based on analyzing the set of higher-sensitivity sensor data, the electronic device may confirm (block 835) the change in motion that was detected in block 810. In confirming the change in motion, the electronic device may detect a subsequent change in motion relative to the electronic device, which may be separate from or a continuation of the change in motion that was detected in block 810, where the change in motion may be associated with the same or different target. In some situations, the electronic device may not confirm the change in motion as a result of analyzing the set of higher-sensitivity sensor data.

At block 840, the electronic device may determine whether the timeout window has expired. If the timeout window has not expired ("NO"), processing may return to block 820, end, or proceed to other functionality. If the timeout window has expired ("YES"), processing may proceed to block 845 at which the electronic device may determine, based on analyzing the additional set of lower-sensitivity sensor data, whether an additional change in motion relative to the electronic device was detected. If the electronic device detects the additional change in motion ("YES"), processing may end, repeat, or proceed to other functionality.

If the electronic device does not detect the additional change in motion ("NO"), the electronic device may deem (block 850), as a false positive, the confirmation of the change in motion from block 835. Additionally, the electronic device may terminate (block 855) the subsequent algorithm that processes the higher-sensitivity sensor data. Further, in embodiments, the electronic device may request the sensor to cease generating the set of higher-sensitivity sensor data.

Although FIG. 8 describes the method 800 as operating using a single sensor, it should be appreciated that the method 800 may operate using multiple sensors. In particular, a first sensor may operate in the lower-sensitivity mode and generate the lower-sensitivity sensor data, and a second, different sensor may operate in the higher-sensitivity mode and generate the higher-sensitivity sensor data.

Figure 9:
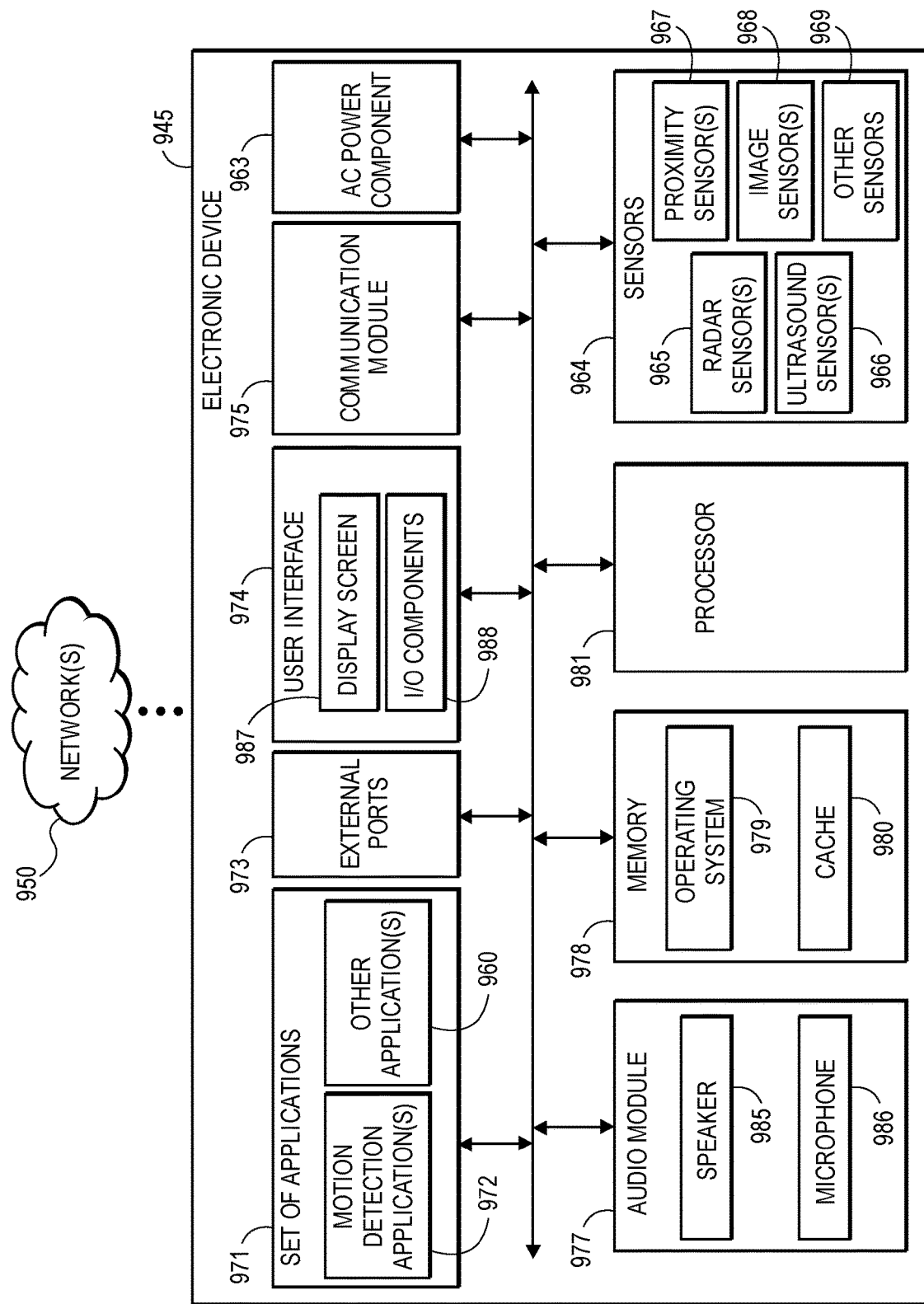
FIG. 9 is a block diagram of an electronic device, in accordance with some embodiments.

FIG. 9 illustrates an example electronic device 945 in which the functionalities as discussed herein may be implemented. The electronic device 945 may include a processor 981 or other similar type of controller module or microcontroller, as well as a memory 978. The electronic device 945 may further include an AC power component 963 or other type of power source (e.g., one or more batteries) configured to supply or provide power to the electronic device 945 and components thereof.

The memory 978 may store an operating system 979 capable of facilitating the functionalities as discussed herein as well as a cache 980 configured to store/cache various sensor data and/or other data. The processor 981 may interface with the memory 978 to execute the operating system 979 and retrieve data from the cache 980, as well as execute a set of applications 971 such as one or more motion detection applications 972 (which the memory 978 can also store). For example, the motion detection applications 972 may include multiple motion detection algorithms configured to analyze various types of sensor data. The memory 978 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 945 may further include a communication module 975 configured to interface with the one or more external ports 973 to communicate data via one or more networks 950. For example, the communication module 975 may leverage the external ports 973 to establish TCP connections for connecting the electronic device 945 to other electronic devices via a Wi-Fi Direct connection. According to some embodiments, the communication module 975 may include one or more transceivers functioning in accordance with IEEE standards, 3GPP standards, or other standards, and configured to receive and transmit data via the one or more external ports 973. More particularly, the communication module 975 may include one or more WWAN transceivers configured to communicate with a wide area network including one or more cell sites or base stations to communicatively connect the electronic device 945 to additional devices or components. Further, the communication module 945 may include one or more WLAN and/or WPAN transceivers configured to connect the electronic device 945 to local area networks and/or personal area networks, such as a Bluetooth® network.

The electronic device 945 may further include a set of sensors 964. In particular, the set of sensors 964 may include one or more radar sensors 965, one or more ultrasound sensors 966, one or more proximity sensors 967, one or more image sensors 969, and/or one or more other sensors 969 (e.g., accelerometers, touch sensors, NFC components, etc.). The electronic device 945 may include an audio module 977 including hardware components such as a speaker 985 for outputting audio and a microphone 986 for detecting or receiving audio. The electronic device 945 may further include a user interface 974 to present information to the user and/or receive inputs from the user. As shown in FIG. 9, the user interface 974 includes a display screen 987 and I/O components 988 (e.g., capacitive or resistive touch-sensitive input panels, keys, buttons, lights, LEDs, cursor control devices, haptic devices, and others). The user interface 974 may also include the speaker 985 and the microphone 986. In embodiments, the display screen 987 is a touchscreen display using singular or combinations of display technologies and may include a thin, transparent touch sensor component superimposed upon a display section that is viewable by a user. For example, such displays include capacitive displays, resistive displays, surface acoustic wave (SAW) displays, optical imaging displays, and the like.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 981 (e.g., working in connection with the operating system 979) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 600, 700, 800 may include one or more function blocks, modules, individual functions or routines in the form of tangible computer-executable instructions that are stored in a non-transitory computer-readable storage medium and executed using a processor of a computing device (e.g., a server device, a personal computer, a smartphone, a tablet computer, a watch, a mobile computing device, or other client computing device, as described herein). The methods 600, 700, 800 may be included as part of any backend server, client computing device modules of the example environment, for example, or as part of a module that is external to such an environment. Though the figures may be described with reference to the other figures for ease of explanation, the methods 600, 700, 800 can be utilized with other objects and user interfaces. Furthermore, although the explanation above describes steps of the methods 600, 700, 800 being performed by specific devices, this is done for illustration purposes only. The blocks of the methods 600, 700, 800 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for managing sensor operation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
obtaining, by a processor and from a radar sensor operating in a lower-sensitivity mode, a first set of lower-sensitivity sensor data, wherein the radar sensor is configured to generate the first set of lower-sensitivity sensor data by emitting first radio waves comprising a first range of frequencies;
analyzing the first set of lower-sensitivity sensor data using a first motion detection algorithm to detect a first change in motion of a target relative to an electronic device, wherein analyzing the first set of lower-sensitivity sensor data comprises identifying a timing shift between least one radio wave of the first radio waves and a radio wave in the first set of lower-sensitivity sensor data; and
in response to detecting the first change in motion of the target relative to the electronic device:
obtaining, by the processor and from the radar sensor operating in the lower-sensitivity mode, a second set of lower-sensitivity sensor data, wherein the radar sensor is configured to generate the second set of lower-sensitivity sensor data by emitting second radio waves comprising the first range of frequencies;
obtaining, by the processor and from the radar sensor operating in a higher-sensitivity mode, a set of higher-sensitivity sensor data, wherein the radar sensor is configured to generate the set of higher-sensitivity sensor data by emitting third radio waves comprising a second range of frequencies different from the first range of frequencies;
analyzing the set of higher-sensitivity sensor data using a second motion detection algorithm to confirm the first change in motion of the target relative to the electronic device, wherein analyzing the set of higher-sensitivity sensor data comprises identifying a timing shift between at least one radio wave of the third radio waves and a radio wave in the set of higher-sensitivity sensor data; and
analyzing the second set of lower-sensitivity sensor data using the first motion detection algorithm to detect a second change in motion of the target relative to the electronic device, wherein analyzing the second set of lower-sensitivity sensor data comprises identifying a timing shift between at least one radio wave of the second radio waves and a radio wave in the second set of lower-sensitivity sensor data.

2. The computer-implemented method of claim 1, wherein confirming the first change in motion of the target relative to the electronic device comprises:
detecting a subsequent change in motion of the target relative to the electronic device, the subsequent change in motion being a continuation of the first change in motion.

3. The computer-implemented method of claim 1, wherein resource consumption of the electronic device caused by executing the second motion detection algorithm is greater than resource consumption of the electronic device caused by executing the first motion detection algorithm.

4. The computer-implemented method of claim 1, wherein the first change in motion of the target corresponds to the target entering an environment in which the electronic device is located, and wherein the second change in motion of the target corresponds to a gesture performed by the target within the environment.

5. The computer-implemented method of claim 1, further comprising,
terminating the second motion detection algorithm in response to detecting the second change in motion of the target relative to the electronic device.

6. The computer-implemented method of claim 1,
wherein resource consumption of the electronic device caused by operating the radar sensor in the higher-sensitivity mode is greater than resource consumption of the electronic device caused by operating the radar sensor in the lower-sensitivity mode.

7. The computer-implemented method of claim 1, wherein the set of higher-sensitivity sensor data is obtained in response to a request, by the processor, for the radar sensor to generate the set of higher-sensitivity sensor data.

8. An electronic device comprising:
a radar sensor; and
a processor interfaced with the radar sensor and configured to:
obtain, from the radar sensor operating in a lower-sensitivity mode, a first set of lower-sensitivity sensor data, wherein the radar sensor is configured to generate the first set of lower-sensitivity sensor data by emitting first radio waves comprising a first range of frequencies;
analyze the first set of lower-sensitivity sensor data using a first motion detection algorithm to detect a first change in motion of a target relative to the electronic device, wherein analyzing the first set of lower-sensitivity sensor data comprises identifying a timing shift between at least one radio wave of the first radio waves and a radio wave in the first set of lower-sensitivity sensor data, and
in response to detecting the first change in motion of the target relative to the electronic device:
obtain, by the processor and from the radar sensor operating in the lower-sensitivity mode, a second set of lower-sensitivity sensor data, wherein the radar sensor is configured to generate the second set of lower-sensitivity sensor data by emitting second radio waves comprising the first range of frequencies;
obtain, from the radar sensor operating in a higher-sensitivity mode, a set of higher-sensitivity sensor data, wherein the radar sensor is configured to generate the set of higher-sensitivity sensor data by emitting third radio waves comprising a second range of frequencies different from the first range of frequencies;
analyze the set of higher-sensitivity sensor data using a second motion detection algorithm to confirm the first change in motion of the target relative to the electronic device, wherein analyzing the set of higher-sensitivity sensor data comprises identifying a timing shift between at least one radio wave of the third radio waves and a radio wave in the set of higher-sensitivity sensor data; and analyze the second set of lower-sensitivity sensor data using the first motion detection algorithm to detect a second change in motion of the target relative to the electronic device, wherein analyzing the second set of lower-sensitivity sensor data comprises identifying a timing shift between at least one radio wave of the second radio waves and a radio wave in the second set of lower-sensitivity sensor data.

9. The electronic device of claim 8, wherein resource consumption of the electronic device caused by executing the second motion detection algorithm is greater than resource consumption of the electronic device caused by executing the first motion detection algorithm.

10. The electronic device of claim 8, wherein the first change in motion of the target corresponds to the target entering an environment in which the electronic device is located, and wherein the second change in motion of the target corresponds to a gesture performed by the target within the environment.

11. The electronic device of claim 8, wherein the processor is further configured to:
terminate the second motion detection algorithm in response to detecting the second change in motion of the target relative to the electronic device.

12. The electronic device of claim 8, wherein resource consumption of the electronic device caused by operating the radar sensor in the higher-sensitivity mode is greater than resource consumption of the electronic device caused by operating the radar sensor in the lower-sensitivity mode.

13. The electronic device of claim 8, wherein the set of higher-sensitivity sensor data is obtained in response to a request for the radar sensor to generate the set of higher-sensitivity sensor data.

14. A non-transitory computer-readable memory storing instructions thereon that, when executed by one or more processors of an electronic device, cause the one or more processors to:
obtain, by a processor and from a radar sensor operating in a lower-sensitivity mode, a first set of lower-sensitivity sensor data, wherein the radar sensor is configured to generate the first set of lower-sensitivity sensor data by emitting first radio waves comprising a first range of frequencies;
analyze the first set of lower-sensitivity sensor data using a first motion detection algorithm to detect a first change in motion of a target relative to the electronic device, wherein analyzing the first set of lower-sensitivity sensor data comprises identifying a timing shift between least one radio wave of the first radio waves and a radio wave in the first set of lower-sensitivity sensor data; and
in response to detecting the first change in motion of the target relative to the electronic device:
obtain, by the processor and from the radar sensor operating in the lower-sensitivity mode, a second set of lower-sensitivity sensor data, wherein the radar sensor is configured to generate the second set of lower-sensitivity sensor data by emitting second radio waves comprising the first range of frequencies;
obtain, by the processor and from the radar sensor operating in a higher-sensitivity mode, a set of higher-sensitivity sensor data, wherein the radar sensor is configured to generate the set of higher-sensitivity sensor data by emitting third radio waves comprising a second range of frequencies different from the first range of frequencies;
analyze the set of higher-sensitivity sensor data using a second motion detection algorithm to confirm the first change in motion of the target relative to the electronic device, wherein analyzing the set of higher-sensitivity sensor data comprises identifying a timing shift between at least one radio wave of the third radio waves and a radio wave in the set of higher-sensitivity sensor data; and
analyze the second set of lower-sensitivity sensor data using the first motion detection algorithm to detect a second change in motion of the target relative to the electronic device, wherein analyzing the second set of lower-sensitivity sensor data comprises identifying a timing shift between at least one radio wave of the second radio waves and a radio wave in the second set of lower-sensitivity sensor data.

15. The non-transitory computer-readable memory of claim 14, wherein
resource consumption of the electronic device caused by executing the second motion detection algorithm is greater than resource consumption of the electronic device caused by executing the first motion detection algorithm.

16. The non-transitory computer-readable memory of claim 15, wherein the instructions further cause the one or more processors to:
terminate the second motion detection algorithm in response to detecting the second change in motion of the target relative to the electronic device.

17. The non-transitory computer-readable memory of claim 14, wherein
resource consumption of the electronic device caused by operating the radar sensor in the higher-sensitivity mode is greater than resource consumption of the electronic device caused by operating the radar sensor in the lower-sensitivity mode.

18. The computer-implemented method of claim 1, further comprising:
analyzing the second set of lower-sensitivity sensor data using the first motion detection algorithm to determine that the confirmation of the first change in motion of the target relative to the electronic device is a false positive.

19. The electronic device of claim 8, wherein the processor is further configured to:
analyze the second set of lower-sensitivity sensor data using the first motion detection algorithm to determine that the confirmation of the first change in motion of the target relative to the electronic device is a false positive.

20. The non-transitory computer-readable memory of claim 15, wherein the instructions further cause the one or more processors to:
analyze the second set of lower-sensitivity sensor data using the first motion detection algorithm to determine that the confirmation of the first change in motion of the target relative to the electronic device is a false positive.

* * * * *